(12) United States Patent
Su et al.

(10) Patent No.: US 12,117,683 B2
(45) Date of Patent: Oct. 15, 2024

(54) DISPLAY PANEL AND DISPLAY DEVICE

(71) Applicant: Shanghai Tianma Micro-Electronics Co., Ltd., Shanghai (CN)

(72) Inventors: Zhidan Su, Shanghai (CN); Jian Zhao, Shanghai (CN); Hong Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/882,228

(22) Filed: Aug. 5, 2022

(65) Prior Publication Data

US 2023/0384630 A1 Nov. 30, 2023

(30) Foreign Application Priority Data

May 30, 2022 (CN) .......................... 202210597527.1

(51) Int. Cl.
*G02F 1/1333* (2006.01)
*G02F 1/1345* (2006.01)

(52) U.S. Cl.
CPC .... *G02F 1/133382* (2013.01); *G02F 1/13454* (2013.01); *G02F 1/13458* (2013.01)

(58) Field of Classification Search
CPC ............. G02F 1/133382; G02F 1/1345; G02F 1/13452; G02F 1/136286; G02F 1/13454
See application file for complete search history.

(56) References Cited

U.S. PATENT DOCUMENTS

| | | | | |
|---|---|---|---|---|
| 2004/0135941 A1* | 7/2004 | Nam | ...................... | G02F 1/1345 349/110 |
| 2008/0316416 A1* | 12/2008 | Chang | ................. | G02F 1/13452 349/149 |
| 2011/0310331 A1* | 12/2011 | Heo | ................... | G02F 1/133615 349/64 |
| 2020/0073168 A1* | 3/2020 | Zhao | ................. | G02F 1/136286 |
| 2021/0048705 A1* | 2/2021 | Lin | ........................ | G02F 1/1339 |

FOREIGN PATENT DOCUMENTS

| | | | |
|---|---|---|---|
| CN | 110750008 A | | 2/2020 |
| CN | 108983476 B | | 9/2021 |
| KR | 20050094530 A | * | 9/2005 |
| KR | 20060087929 A | * | 8/2006 |

\* cited by examiner

*Primary Examiner* — Alexander P Gross
(74) *Attorney, Agent, or Firm* — Anova Law Group, PLLC

(57) ABSTRACT

A display panel includes a substrate and heating wires located at least in a display area of the substrate. The heating wires extend along a first direction and are arranged along a second direction. The first direction intersects with the second direction. Each heating wire includes a first signal end and a second signal end. The first signal end and the second signal end of the same heating wire are located on two sides of the same heating wire along the first direction. First signal ends of the plurality of heating wires are located on a first side of the display area along the first direction. Second signal ends of the plurality of heating wires are located on a second side of the display area along the first direction.

18 Claims, 18 Drawing Sheets

DISPLAY PANEL AND DISPLAY DEVICE

CROSS-REFERENCE TO RELATED APPLICATION

This application claims priority to Chinese Patent Application No. 202210597527.1, filed on May 30, 2022, the entire content of which is incorporated herein by reference.

TECHNICAL FIELD

The present disclosure relates to the display technology field and, more particularly, to a display panel and a display device.

BACKGROUND

Liquid crystal is a special form of material, which has the birefringence peculiar to crystal and fluidity of a liquid. A liquid crystal display is a display device made by using liquid crystal molecules, in which an optical property of the crystal molecules changes in an external electric field. The liquid crystal display has various types and has been widely used in various displays and electronic instruments. However, due to limitation of a liquid crystal material, response time of the liquid crystal increases at a low temperature. After the response time of the liquid crystal increases, the display quality deteriorates, and a dynamic image has a problem such as tailing and smearing, which affects a visual effect. When the temperature decreases further (below −30° C.), an alignment layer of the display will be damaged, a liquid crystal state will disappear and become crystal, the performance of the liquid crystal state will be lost, and the screen will not be displayed.

In order to solve the above problems, in the existing technology, a heater is configured to heat the liquid crystal screen. For example, a heating device is arranged between a backlight source and a liquid crystal display device. As such, a thickness of a liquid crystal display assembly is increased, and complexity of a structure is increased.

SUMMARY

Embodiments of the present disclosure provide a display panel, including a substrate, a display area located on the substrate, and a plurality of heating wires. The plurality of heating wires are located at least in the display area. The plurality of the heating wires extend along a first direction and are arranged along a second direction. The first direction intersects with the second direction. Each heating wire of the plurality of heating wires includes a first signal end and a second signal end. The first signal end and the second signal end of the same heating wire are located on two sides of the heating wire along the first direction. First signal ends of the plurality of heating wires are located on a first side of the display area along the first direction. Second signal ends of the plurality of heating wires are located on a second side of the display area along the first direction. The first side and the second side are opposite to each other.

Embodiments of the present disclosure provide a display device, including a display panel. The display panel includes a substrate, a display area located on the substrate, and a plurality of heating wires. The plurality of heating wires are located at least in the display area. The plurality of the heating wires extend along a first direction and are arranged along a second direction. The first direction intersects with the second direction. Each heating wire of the plurality of heating wires includes a first signal end and a second signal end. The first signal end and the second signal end of the same heating wire are located on two sides of the heating wire along the first direction. First signal ends of the plurality of heating wires are located on a first side of the display area along the first direction. Second signal ends of the plurality of heating wires are located on a second side of the display area along the first direction. The first side and the second side are opposite to each other.

Compared to the existing technology, the display panel and the display device of the present disclosure may have at least the following beneficial effects.

In the display panel and the display device of the present disclosure, the heating wires are arranged on the display panel. In a low temperature phase, the heating wires may be configured to heat the display panel, which satisfies the normal use requirement of the display product in the low temperature environment. In addition, compared to the solution of additionally introducing the heater in the existing technology, the structure of the product may be significantly simplified. In the present disclosure, the first signal ends of the heating wires are arranged on the first side of the display area in the first direction. The second signal ends of the heating wires are arranged on the second side of the display area along the first direction. As such, the first signal ends of the heating wires may receive the heating drive signal through the same heating bus. The second signal ends of the heating wires may receive the heating drive signal through the other heating bus. Therefore, the wiring complexity may be simplified after the heating wires are introduced in the display panel, the manufacturing process may be simplified, and the cost may be saved.

DETAILED DESCRIPTION OF THE EMBODIMENTS

Embodiments of the present disclosure are described in detail in connection with the accompanying drawings. Unless otherwise specified, a relative arrangement of components and processes, a numerical expression, and a numerical value described in embodiments of the present disclosure are not intended to limit the scope of the present disclosure.

Description of embodiments of the present disclosure is merely exemplary and illustrative and is not intended to limit the present disclosure.

A technology, a method, and a device known to those of ordinary skill in the art are not discussed in detail, but such the technology, method, and device should be considered as a part of the specification when it is appropriate.

In all examples shown and discussed herein, any specific value should only be considered illustrative and should not be considered a limitation. Thus, another exemplary embodiment may have a different value.

It is apparent to those skilled in the art that various modifications and variations can be made in the present disclosure without departing from the spirit or scope of the present disclosure. Thus, the present disclosure is intended to cover the modifications and variations of the present disclosure that are within the scope of the corresponding claims (claimed technical solutions) and the scope of equivalents of the claims. Embodiments of the present disclosure may be combined with each other when there is no contradiction.

A similar numeral and letter may refer to a similar item in the accompanying drawings. Thus, once an item is defined in a drawing, the item may not need to be further discussed in the subsequent drawings.

Figure 1:
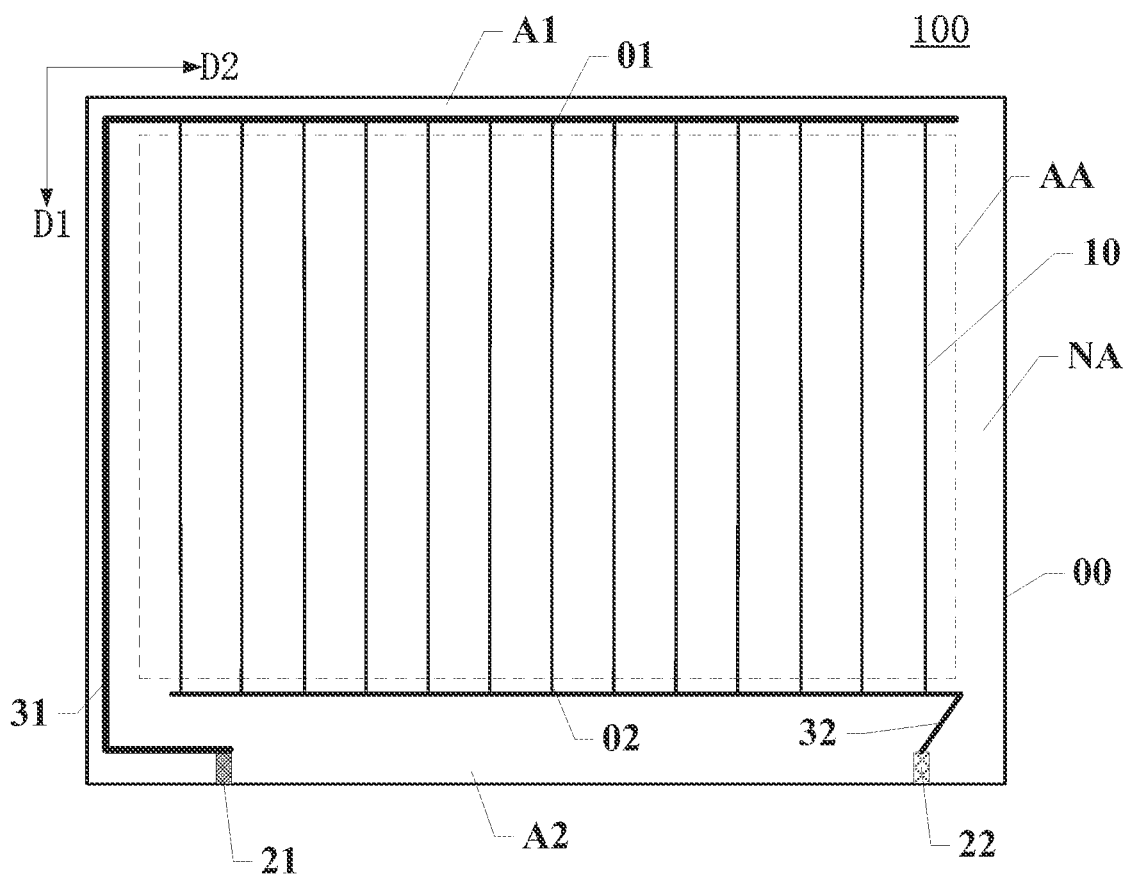
FIG. 1 is a schematic top view of a display panel according to some embodiments of the present disclosure.

FIG. 1 is a schematic top view of a display panel according to some embodiments of the present disclosure. As shown in FIG. 1, embodiments of the present disclosure provide a display panel 100. The display panel 100 includes a substrate 00, a display area AA located on the substrate 00, and a plurality of heating wires 10 located at least in the display area AA. The plurality of heating wires 10 extend along a first direction D1 and are arranged along a second direction D2. The first direction D1 and the second direction D2 intersect with each other.

Each of the plurality of heating wires 10 includes a first signal end 01 and a second signal end 02. A first signal end 01 and a second signal end 02 of a same heating wire 10 are located on two sides of the heating wire 10 in the first direction D1, respectively. The first signal ends 01 of each of the plurality of heating wires 10 is located on a first side A1 of the display area AA in the first direction D1. The second signal end 02 of each of the plurality of heating wires 10 is located on a second side A2 of the display area AA in the first direction D1. The first side A1 and the second side A2 are opposite to each other.

FIG. 1 only illustrates the display panel of the present disclosure by taking the display panel having a rectangular structure as an example and does not limit the actual shape of the display panel. In some other embodiments of the present disclosure, the display panel may be in another shape other than the rectangular shape, e.g., circular shape, oval shape, or a non-rectangular special-shaped structure.

In order to clearly illustrate the content of the present disclosure, FIG. 1 only shows the plurality of heating wires 10 in the display area AA. In order to realize a display function, a plurality of signal lines, e.g., a gate line, a data line, and a clock signal line, may be arranged in the display area AA, which are not shown in FIG. 1. Simultaneously, a pixel circuit may also be arranged in the display area AA, and a drive circuit may also be arranged in a non-display area NA.

Figure 2:
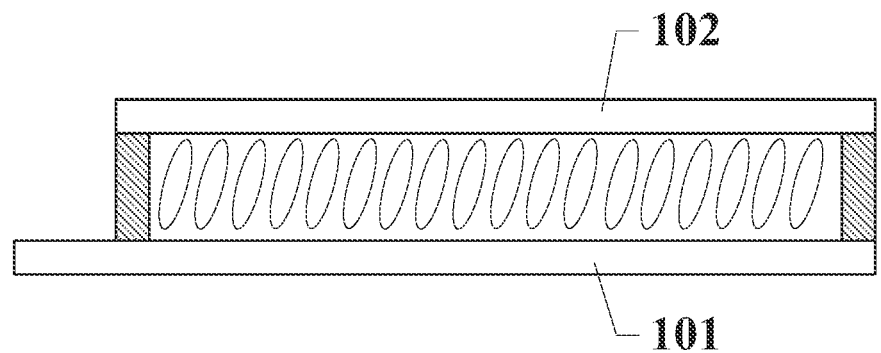
FIG. 2 is a schematic diagram showing a film layer of the display panel according to some embodiments of the present disclosure.

In some embodiments, a display panel of embodiments of the present disclosure may include a liquid crystal display panel. FIG. 2 is a schematic diagram showing a film layer of the display panel according to some embodiments of the present disclosure. The display panel includes an array substrate 101, a color film substrate 102, and liquid crystal molecules arranged between the array substrate 101 and the color film substrate 102. The heating wires 10 of embodiments of the present disclosure may be arranged on the array substrate 101, on the color film substrate 102, or on both the array substrate 101 and the color film substrate 102. With such arrangements, the liquid crystal may be heated in a low temperature environment, which meets a use requirement of the display panel in the low temperature environment. The display panel of embodiments of the present disclosure may be not limited to a liquid crystal display panel. For example, the display panel may include an electrophoretic display panel.

Refer still to FIG. 1, in embodiments of the present disclosure, compared to a manner of arranging a heater outside of the display panel in the existing technology, the heating wires 10 are closer to the liquid crystal molecules by arranging the heating wires 10 in the display panel 100. In a low temperature display phase, the heating wires 10 may be configured to heat the liquid crystal molecules in the display panel. The heating wires 10 of embodiments of the present disclosure may be connected in parallel between a first heating bus 31 and a second heating bus 32. A DC voltage or a DC current may be supplied to the heating wire 10 through the first signal end 01 and the second signal end 02 of the heating wire 10. When the DC voltage or the DC current is supplied to the heating wire 10, the heating wire 10 may be heated up by the DC voltage or the DC current. Heat of the heating wire 10 may directly act on the liquid crystal molecules to heat the liquid crystal molecules in the display panel, which may be beneficial to improve a heating speed and satisfies a normal use requirement of a display product in a low temperature environment. Compared to the existing technology of introducing externally the heater, the solution of arranging the heating wires 10 in the display panel may significantly simplify the structure of the product. In addition, in the low temperature environment, the display panel may be continuously heated as needed to keep the liquid crystal molecules at a suitable working temperature to reduce viscous resistance of the liquid crystal molecules and improve a state change speed of the liquid crystal molecules. Thus, the solution of embodiments of the present disclosure may be beneficial to improve a tailing phenomenon of the display image to improve the display quality of the product.

Further, in the present disclosure, first signal ends 01 of the heating wires 10 are arranged on a same side, for example, on the first side A1 of the display area AA along the first direction D1. Second signal ends 01 of the heating wires 10 are arranged on a same side, for example, on the second side A2 of the display area AA along the first direction D1. Thus, the first signal ends 01 of the heating wires 10 may receive a heating drive signal through a same heating bus. The second signal ends 02 of the heating wires 10 may receive a heating drive signal through another heating bus, which is beneficial to simplify wiring complexity after the heating wires 10 are introduced into the display panel. A manufacturing process may be simplified, and costs may be also saved.

Refer still to FIG. 1, in embodiments of the present disclosure, the display panel 100 further includes a non-display area NA arranged at least partially around the display area AA and a first voltage terminal 21 and a second voltage terminal 22 arranged in the non-display area NA. The first signal ends 01 is electrically connected to the first voltage terminal 21 through the first heating bus 31. The second signal end 02 is electrically connected to the second voltage terminal 22 through the second heating bus 32.

In embodiments of the present disclosure, the first voltage terminal 21 that provides a signal to the first signal end 01 of the heating wire 10 and the second voltage terminal 21 that provides a signal to the second signal end 02 of the heating wire 10 may be arranged in the non-display area NA. The first voltage terminal 21 may be electrically connected to the first heating bus 31. The first heating bus 31 may be electrically connected to the first signal ends 01 of the heating wires 10. The second voltage terminal 22 may be electrically connected to the second heating bus 32. The second heating bus 32 may be electrically connected to the second signal ends 02 of the heating wires 10. Thus, a same signal may be transmitted to the first signal ends 01 through the same first heating bus 31. A same signal may be transmitted to the second signal ends 02 through the same second heating bus 32. The wiring complexity may be significantly simplified after the heating wires 10 are introduced in the display panel. The manufacturing process of the display panel with the heating function may be simplified. In addition, the display area may be heated uniformly.

In some embodiments, when the first signal end 01 and the second signal end 02 are arranged in non-display areas on different sides, respectively, the first heating bus 31 and the second heating bus 32 that are connected to the first signal end 01 and the second signal end 02, respectively, may be arranged the non-display areas on the different sides. Thus, a problem that a width of a frame is too big when the first heating bus 31 and the second heating bus 32 are arranged on a same side may be avoided. Thus, the solution of the present disclosure may be beneficial to realizing a narrow frame design of the product.

In embodiments of the present disclosure, the first voltage terminal 21 may be a positive voltage terminal, and the second voltage terminal 22 may be a negative voltage terminal, or the first voltage terminal 21 may be the negative voltage terminal, and the second voltage terminal 22 may be the positive voltage terminal, which is not limited in the present disclosure. When a certain DC voltage is supplied to the heating wire 10 through the first voltage terminal 21 and the second voltage terminal 22, the heating wire 10 may generate heat to heat the liquid crystal in the display panel.

Refer still to FIG. 1, in embodiments of the present disclosure, the first voltage terminal 21 and the second voltage terminal 22 are arranged on the same side of the display area AA.

Figure 3:
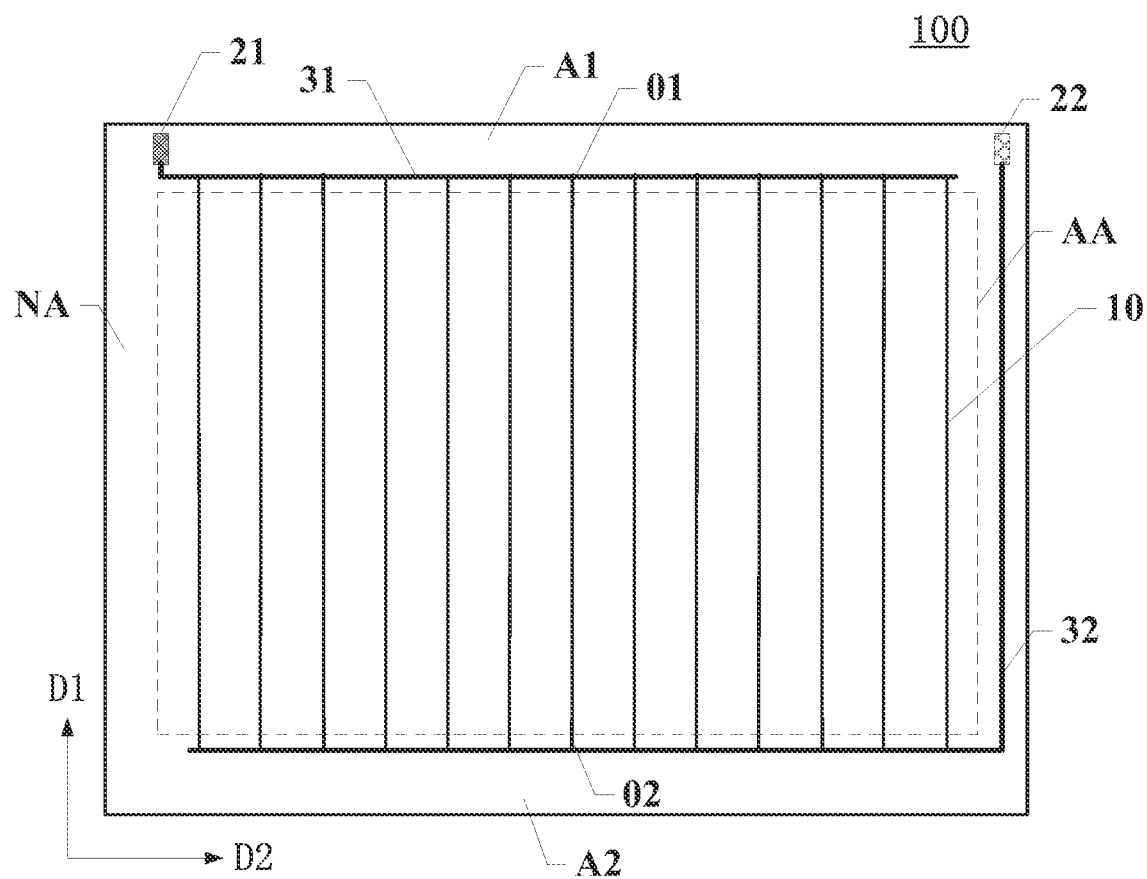
FIG. 3 is a schematic top view of another display panel according to some embodiments of the present disclosure.
Figure 4:
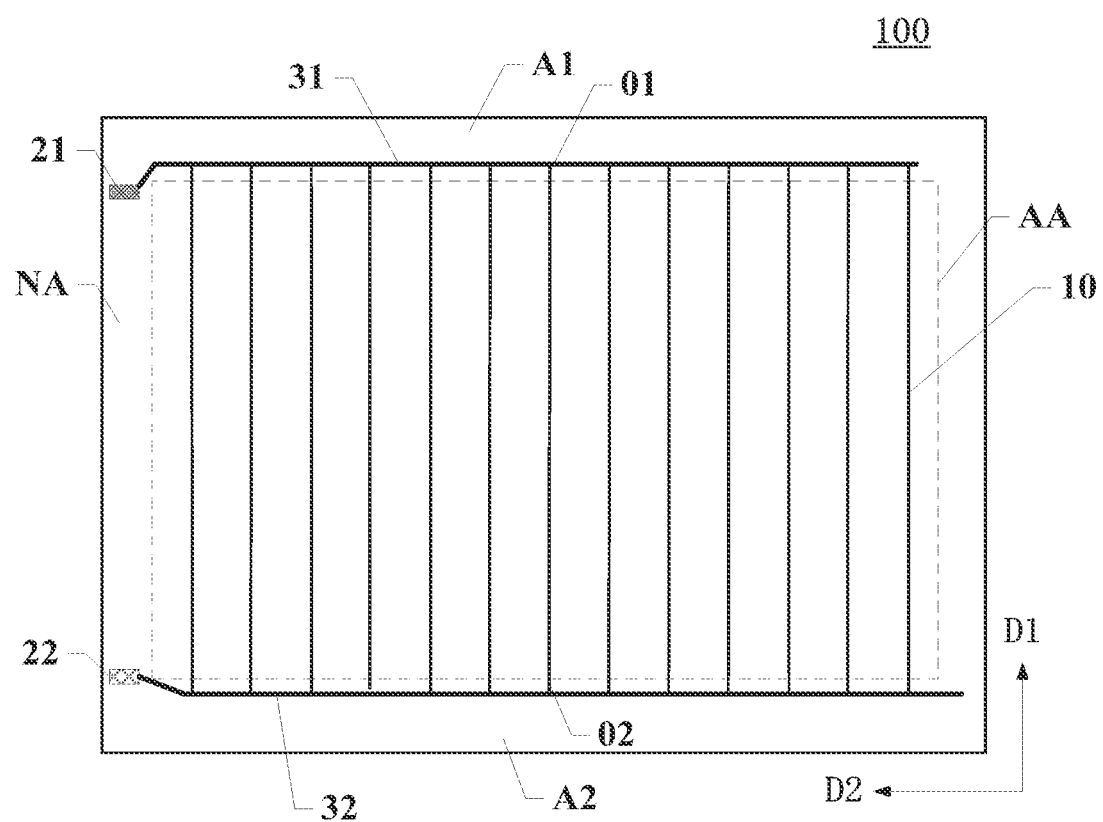
FIG. 4 is a schematic top view of another display panel according to some embodiments of the present disclosure.

In practical applications, the first voltage terminal 21 and the second voltage terminal 22 may be electrically connected to an external circuit through a flexible circuit board. The heating drive signal may be provided to the first voltage terminal 21 and the second voltage terminal 22 through the external circuit to further transmit the heating drive signal to the heating traces 10. In embodiments of the present disclosure, when the first voltage terminal 21 and the second voltage terminal 22 are arranged on the same side of the display area AA, the first voltage terminal 21 and the second voltage terminal 22 may be electrically connected to the same flexible circuit board, which is beneficial to reduce a number of flexible circuit boards bounded on the display panel to simplify the manufacturing process of the product. FIG. 1 only shows the solution of arranging the first voltage terminal 21 and the second voltage terminal 22 on the second side A2 of the display area AA. In some other embodiments of the present disclosure, as shown in FIG. 3. the first voltage terminal 21 and the second voltage terminal 22 may also be arranged on the first side A1 of the display area AA. As shown in FIG. 4, the first voltage terminal 21 and the second voltage terminal 22 are also arranged on another side neighboring to the first side A1 and the second side A2. The present disclosure does not limit the arrangement of the first voltage terminal 21 and the second voltage terminal 22. FIG. 3 and FIG. 4 illustrate other top views of display panels according to some embodiments of the present disclosure.

FIG. 1, FIG. 3, and FIG. 4 illustrate the solutions of arranging the first voltage terminal 21 and the second voltage terminal 22 on a same side of the display area AA. In some other embodiments, the first voltage terminal 21 and the second voltage terminal 22 may also be arranged on different sides of the display panel. For example, FIG. 5 and FIG. 6 illustrate other top views of display panels according to some embodiment of the present disclosure.

Figure 5:
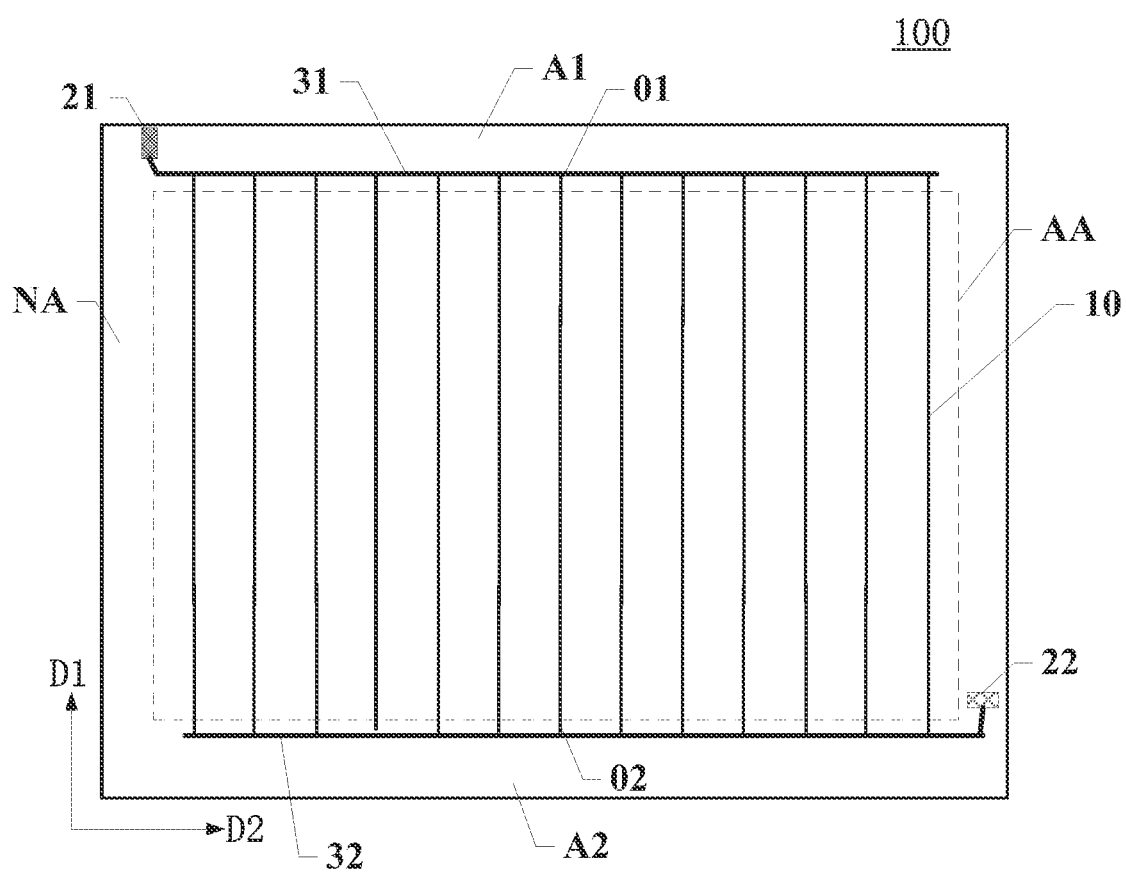
FIG. 5 is a schematic top view of another display panel according to some embodiments of the present disclosure.
Figure 6:
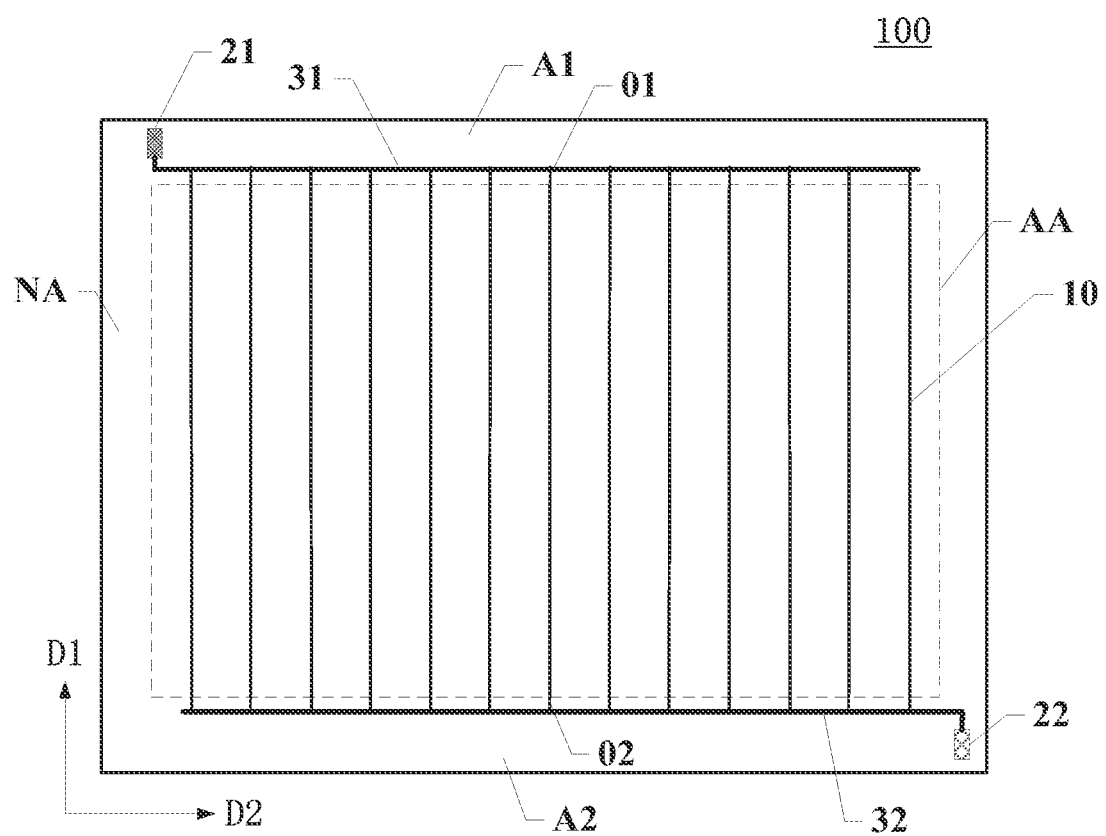
FIG. 6 is a schematic top view of another display panel according to some embodiments of the present disclosure.

Refer still to FIG. 5 and FIG. 6, in some embodiments of the present disclosure, the first voltage terminal 21 and the second voltage terminal 22 are located on different sides of the display area AA, respectively.

In some embodiments, FIG. 5 shows a solution of arranging the first voltage terminal 21 on the first side A1 of the display area AA and the second voltage terminal 22 on a side neighboring to the second side A2. Since the first voltage terminal 21 is electrically connected to the first signal end 01 of the heating wire 10, and the first signal end 01 is located on the first side A1 of the display area AA, when the first voltage terminal 21 is arranged on the first side A1 of the display area AA, a distance between the first voltage terminal 21 and the first signal end 01 may be reduced. Thus, a length of the first heating bus 31 that is led out from the first voltage terminal 21 may be reduced, which is beneficial to reduce heat consumption of the first heating bus 31. Therefore, more heat may be conducted to the heating wires 10, and the effective utilization of the heat may be increased. Considering that less circuits and wirings are arranged on the second side A2 opposite to the first side A1, when the second voltage terminal 22 is arranged on a side neighboring to the second side A2, the space of the display panel may be reasonably utilized.

In some embodiments, FIG. 6 a solution of arranging the first voltage terminal 21 on the first side A1 of the display area AA and the second voltage terminal 22 on the second side A2 of display area AA. Since the first voltage terminal 21 is electrically connected to the first signal end 01 of the heating wire 10, and the first signal end 01 is located on the first side A1 of the display area AA, when the first voltage terminal 21 is arranged on the first side A1 of the display area AA, a distance between the first voltage terminal 21 and the first signal end 01 may be reduced. Thus, a length of the first heating bus 31 that is led out from the first voltage terminal 21 may be reduced, which is beneficial to reducing heat consumption of the first heating bus 31. Therefore, more heat may be conducted to the heating wire 10, and the effective utilization of the heat may be increased. Similarly, since the second voltage terminal 22 is electrically connected to the second signal end 02 of the heating wire 10, and the second signal end 02 is located on the second side A2 of the display area AA, when the second voltage terminal 22 is arranged on the second side A2 of the display area AA, a distance between the second voltage terminal 22 and the second signal end 02 may be reduced. Thus, a length of the second heating bus 32 that is led out from the second voltage terminal 22 may be reduced, and the heat consumption of the second heating bus 32 may be reduced. Therefore, more heat may be conducted to the heating wire 10, and the effective utilization of the heat may be increased.

Figure 7:
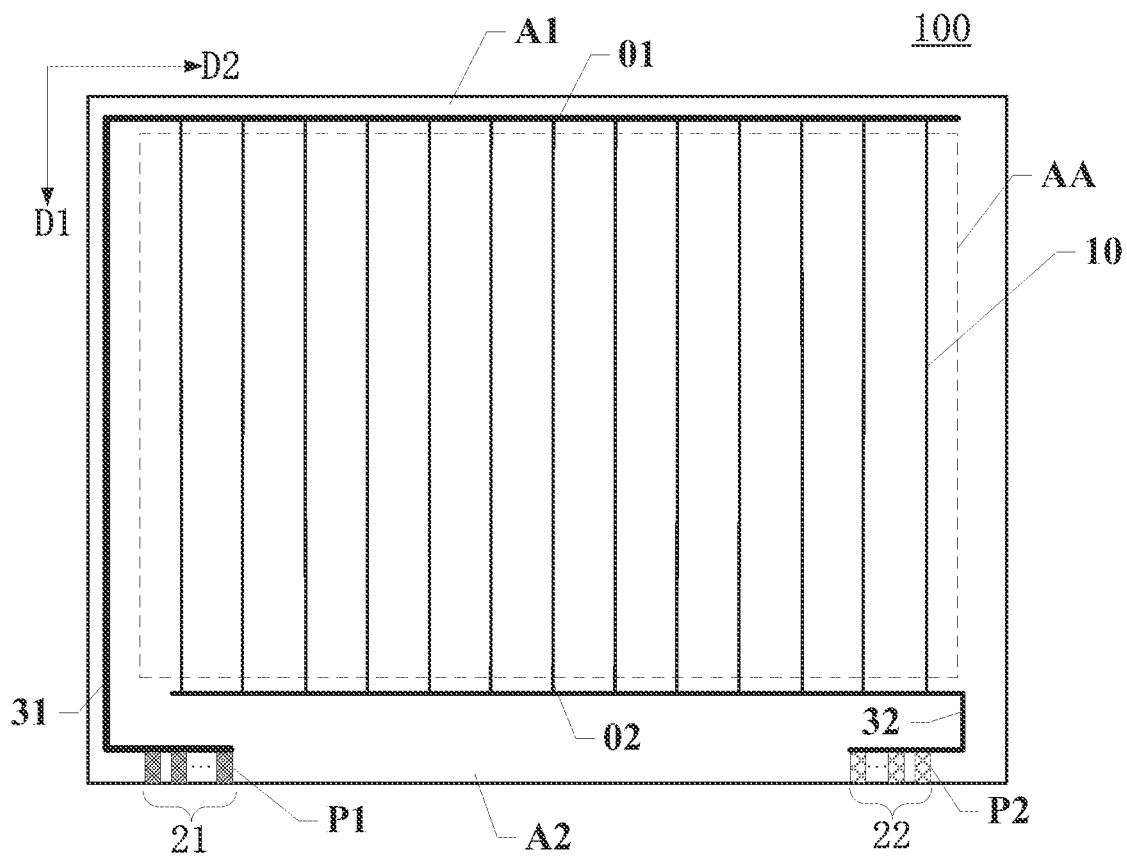
FIG. 7 is a schematic top view of another display panel according to some embodiments of the present disclosure.
Figure 8:
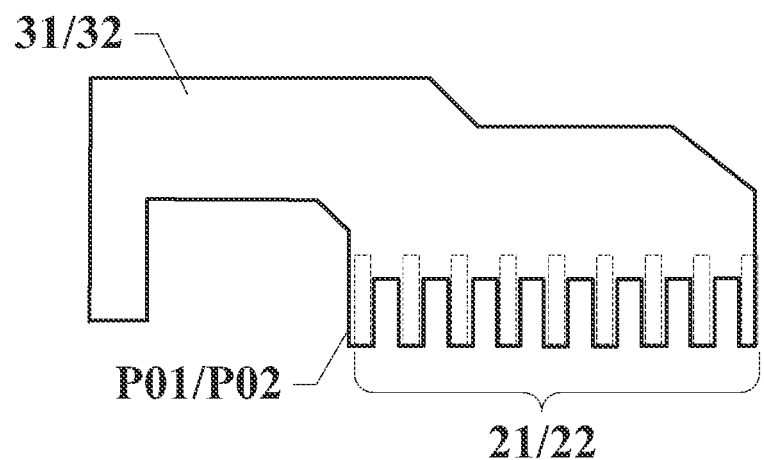
FIG. 8 is a schematic diagram showing a connection of a first heating wire and a first heating welding plate according to some embodiments of the present disclosure.

FIG. 7 is a schematic top view of another display panel according to some embodiments of the present disclosure. FIG. 8 is a schematic diagram showing a connection of a first heating bus 31 and a first heating welding plate P01 according to some embodiments of the present disclosure. In some embodiments, in FIG. 8, the first heating bus 31 and the first heating welding plate P01 are arranged on a same layer or the second heating bus 32 and a second heating welding plate P02 are arranged on a same layer as an example for description. As shown in FIG. 7 and FIG. 8, in embodiments of the present disclosure, the first voltage terminal 21 includes a plurality of first heating welding plates P01, the second voltage terminal 22 includes a plurality of second heating welding plates P02. The first heating bus 31 is electrically connected to the plurality of first heating welding plates P01. The second heating bus 32 is electrically connected to the plurality of second heating welding plates P02.

In some embodiments, in embodiments of the present disclosure, the heating drive signal may be transmitted through an electrical connection between the flexible circuit board and the first voltage terminal 21 and the second voltage terminal 22. A dotted rectangle in FIG. 8 represents a position corresponding to the heating welding plate, to which the first heating welding plate P01 or the second heating welding plate P02 is electrically connected to the flexible circuit board. Considering that current loading capacity of the flexible circuit board is limited, if only one heating welding plate is arranged at the first voltage terminal 21 or the second voltage terminal 22, the current on the heating welding plate may be too large. In embodiments of the present disclosure, the plurality of first heating welding plates P01 are arranged at the first voltage terminal 21, and the plurality of second heating welding plates P02 are arranged at the second voltage terminal 22 simultaneously. When the flexible circuit board is connected to the first voltage terminal 21 and the second voltage terminal 22, the current on the flexible circuit board may be shunted to adapt to the current loading capability of the flexible circuit board to protect a normal operation of the heating circuit.

In some embodiments, when the first heating bus 31 is electrically connected to the plurality of first heating welding plates P01, the signals transmitted on the first heating welding plates P01 may be the same. When the second heating bus 32 is electrically connected to the plurality of second heating welding plates P01, the signals transmitted on the second heating welding plates P2 may be also the same.

In the present disclosure, the number of the first heating welding plates P01 connected to the first heating bus 31 may not be limited, and the number of the second heating welding plates P02 corresponding to the second heating bus 32 may also not be limited. For the arrangement of the second heating welding plates P02, reference may be made to the arrangement of the first heating welding plates P01 in embodiments of the present disclosure, which is not limited in the present disclosure. FIG. 7 only illustrates the shapes of the first heating welding plate P01 and the second heating welding plate P02 by using the heating welding plate in a rectangular structure, which does not limit the actual shape of the heating welding plate. In some other implementations of the present disclosure, the heating welding plate may also be in another shape.

Refer to FIG. 7, in embodiments of the present disclosure, the first voltage terminal 21 and the second voltage terminal 22 are both located on the second side A2.

In embodiments of the present disclosure, a solution of arranging the first voltage terminal 21 and the second voltage terminal 22 that provide the heating drive signal to the first signal end 01 and the second signal end 02 on the second side A2 of the display area AA may be provided. Since the first signal end 01 and the second signal end 02 of the heating wire 10 are arranged on the first side A1 and the second side A2, respectively, the first heating bus 31 may be extended from the second side A2 to the first side A1 to be electrically connected to the first signal end 01. The second heating bus 32 may be electrically connected to the second signal end 02 of the second side A2 near the second side A2. Thus, the first heating bus 31 and the second heating bus 32 that are connected to the first voltage terminal 21 and the second voltage terminal 22, respectively, may be arranged on different sides of the display panel to appropriately utilize the frame space of the display panel. Thus, a problem that the frame is too large by arranging the first heating bus 31 and the second heating bus 32 on the same side may be avoided.

Figure 9:
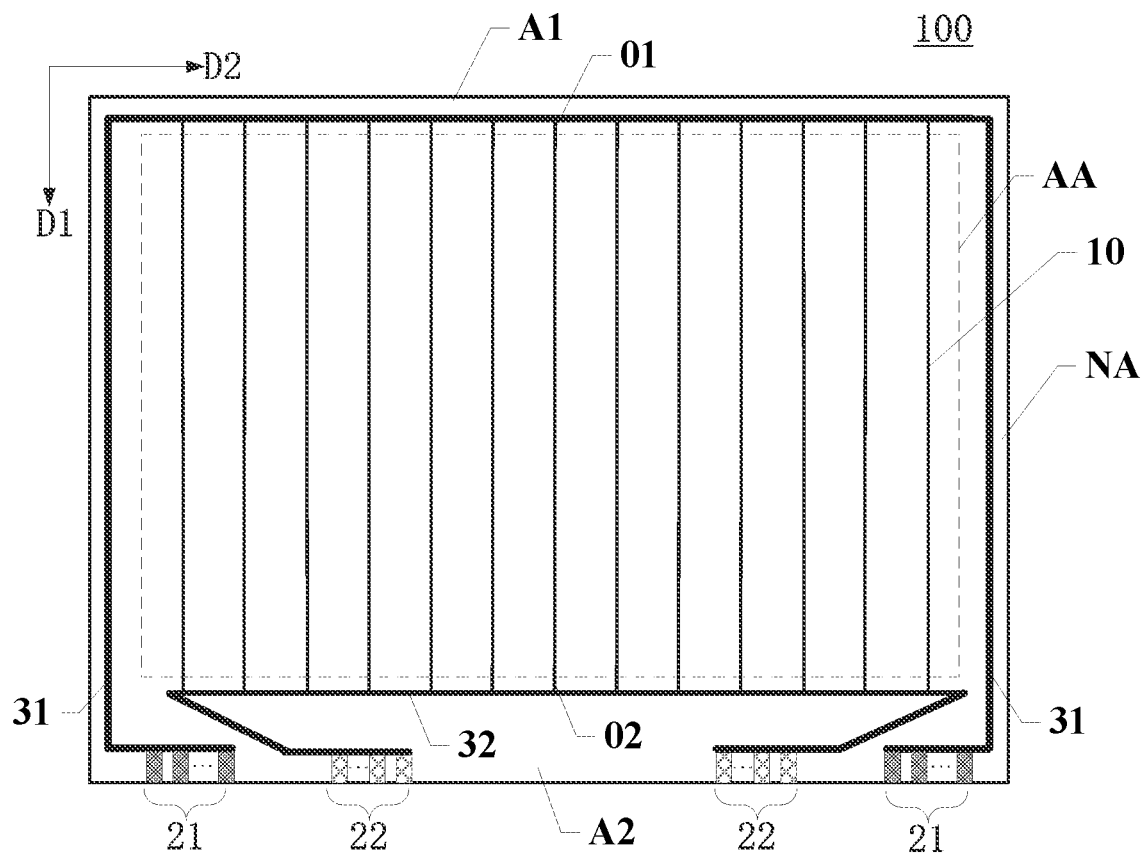
FIG. 9 is a schematic top view of another display panel according to some embodiments of the present disclosure.

FIG. 9 is a schematic top view of another display panel according to some embodiments of the present disclosure. As shown in FIG. 9, in embodiments of the present disclosure, the display panel includes two first voltage terminals 21. The heating bus 31 is led out from a first voltage terminal 21 and is extended to the first side A1 along the non-display area NA, and is extended from the first side A1 to the other first voltage terminal 21. The two first voltage terminals 21 are electrically connected to the first heating bus 31.

In some embodiments, FIG. 9 shows a solution of arranging the two first voltage terminals 21 on the display panel and electrically connecting the two first voltage terminals 21 to the first heating bus 31. Considering that when one first voltage terminal 21 is configured to provide heating drive signals to the plurality of heating wires 10 through the first heating bus 31, the power consumption of the first heating bus 31 may be relatively large, the heating wires 10 may have a relatively low heating efficiency on the display area AA. When the two first voltage terminals 21 are arranged to be electrically connected to the first heating bus 31, the two first voltage terminals 21 may simultaneously provide the heating drive signal to the first heating bus 31. Thus, heating drive capability and heating efficiency may be improved. In addition, in embodiments of the present disclosure, the heating wires 10 may be connected in parallel. When two first voltage terminals 21 are arranged, a bilateral drive mode may be formed. First heating buses 31 that are connected to the two first voltage terminals 21, respectively, may be in a parallel relationship. Thus, a total impedance of the first heating buses 31 may be reduced, which is beneficial to reduce the power consumption of the first heating buses 31. Thus, the heating wires 10 may obtain more effective power, which is more beneficial to improve the heating efficiency of the heating wires 10 to the display area AA.

Refer still to FIG. 9, in embodiments of the present disclosure, the display panel 100 includes two second voltage terminals 22. The second heating bus 32 is led out from one of the second voltage terminals 22 and is extended from the second side A2 to the other one of the second voltage terminals 22. The two second voltage terminals 22 are electrically connected to the second heating bus 32.

In embodiments of the present disclosure, FIG. 9 shows a solution of introducing the two second voltage terminals 22 on the display panel. The second heating bus 32 electrically connected to the second voltage terminals 22 is located on the second side A2. The two second voltage terminals 22 are electrically connected to the heating wire 10. Considering that when one second voltage terminal 22 is configured to provide heating drive signals to a plurality of heating wires 10 through the second heating bus 32, the power consumed by the second heating bus 32 may be relatively large. Thus, the heating wires 10 may have a relatively low heating efficiency to the display area AA. When the two second voltage terminals 22 are introduced to be electrically connected to the second heating bus 32, the two second voltage terminals 22 may simultaneously provide the heating drive signal to the second heating bus 32, which is beneficial to improve the heating drive capability and the heating efficiency. In addition, in embodiments of the present disclosure, the heating wires 10 are in a parallel relationship. When the two second voltage terminals 22 are arranged, a bilateral drive mode may be formed. The second heating bus 32 that is connected to the two second voltage terminals 22 respectively may also be in a parallel relationship. Thus, a total impedance of the second heating bus 32 may be reduced. Thus, the power consumed by the second heating bus 32 may be reduced, and the heating wires 10 may obtain more effective power. Therefore, the heating efficiency of the heating wires 10 to the display area AA may be further improved.

Refer still to FIG. 9, in embodiments of the present disclosure, the display panel includes the two first voltage terminals 21 and the two second voltage terminals 22. Along the second direction D2, the second voltage terminals 22 are located between the two first voltage terminals 21.

In embodiments of the present disclosure, FIG. 9 shows an arrangement of the first voltage terminals 21 and the second voltage terminals 22 when the two first voltage terminals 21 and the two second voltage terminals 22 are arranged on the second side A2. In some embodiments, the two first voltage terminals 21 are arranged at both ends of the second side A2, respectively. The two second voltage terminals 22 are arranged between the two first voltage terminals 21. Since the first voltage terminals 21 are electrically connected to the first signal end 01 located on the first side A1, when the first voltage terminals 21 are arranged at the two ends of the second side A2, the wiring of the first heating bus 31 from the second side A2 to the first side A1 may be convenient. Thus, intersection of the first heating bus 31 and the second heating bus 32 may be avoided, and the overall wiring complexity of the display panel may be simplified.

Figure 10:
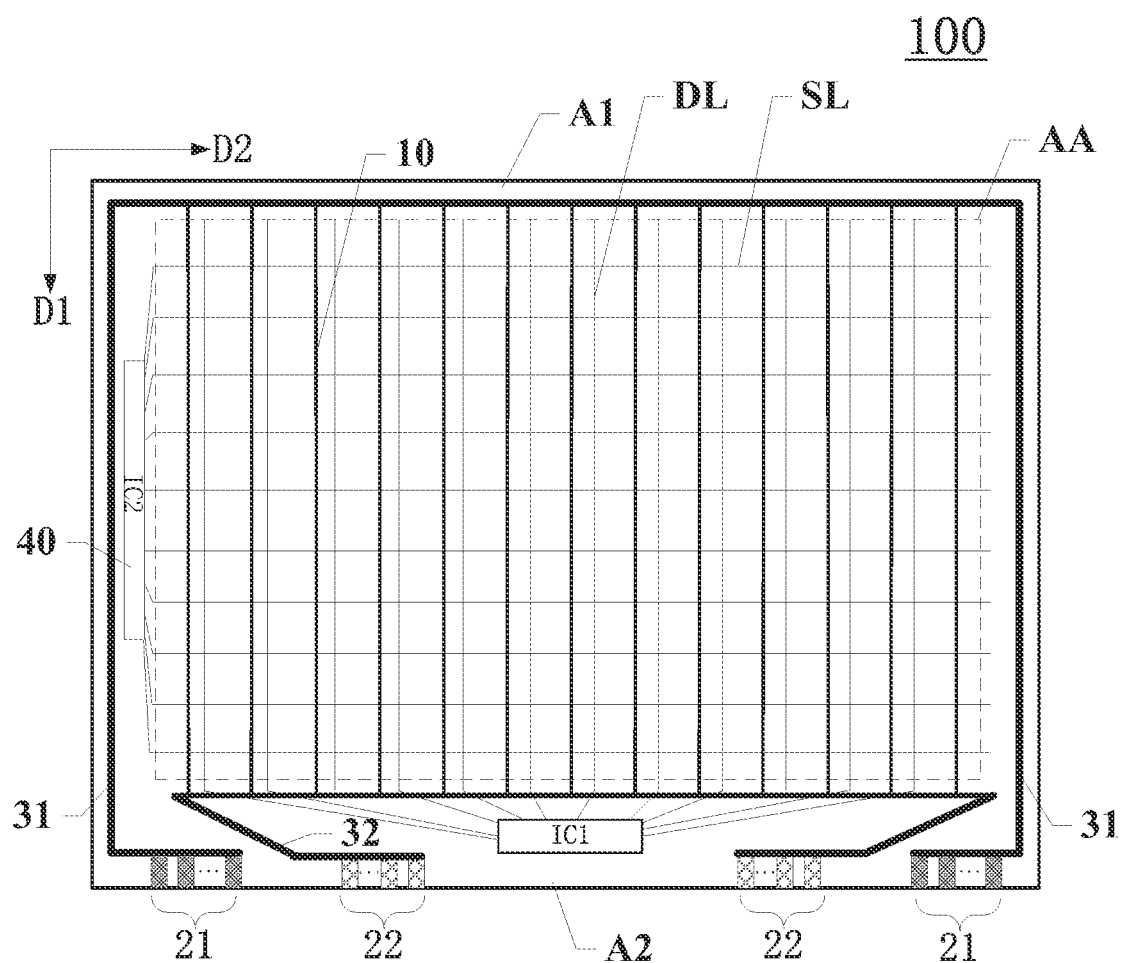
FIG. 10 is a schematic top view of another display panel according to some embodiments of the present disclosure.
Figure 11:
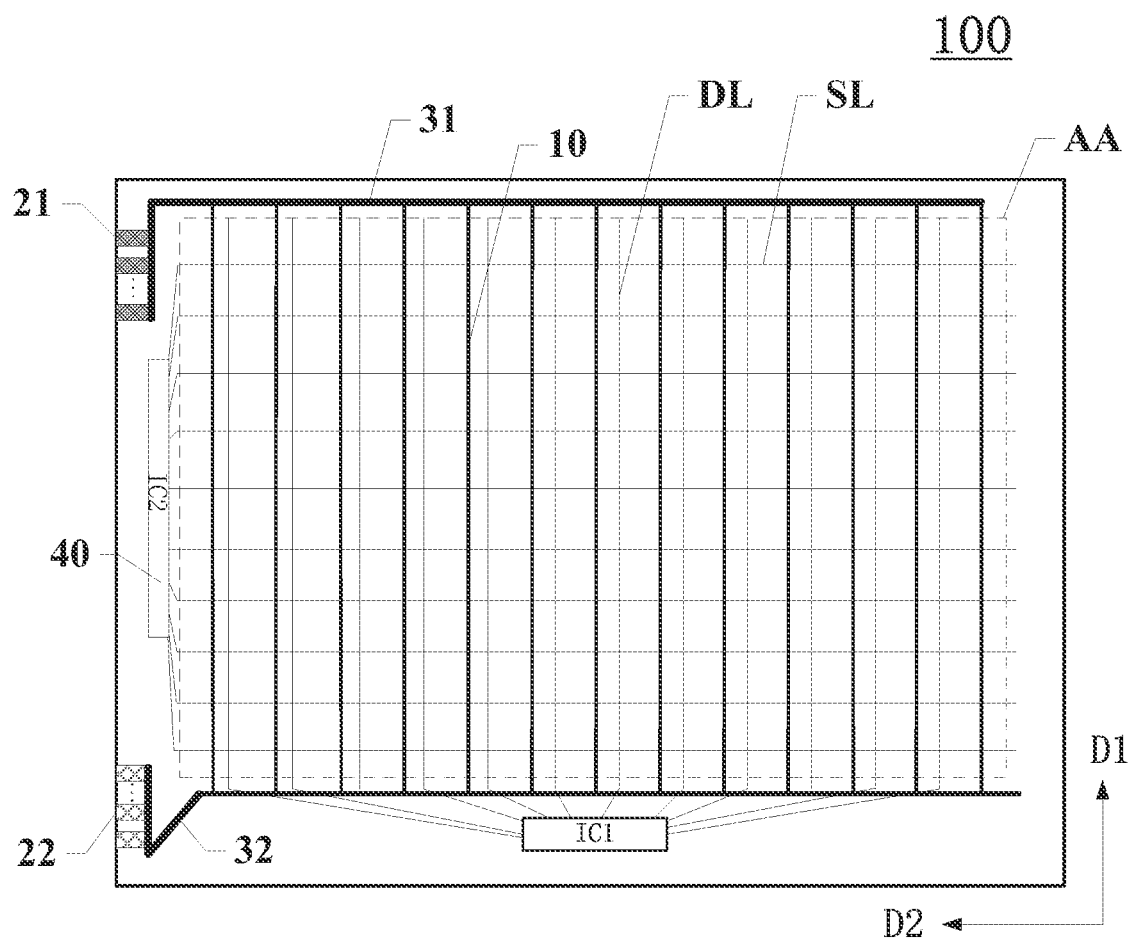
FIG. 11 is a schematic top view of another display panel according to some embodiments of the present disclosure.

FIG. 10 shows a schematic top view of another display panel according to embodiments of the present disclosure. In embodiments of the present disclosure, a solution of arranging the first voltage terminal 21 and the second voltage terminal 22 on a same side with a source drive chip IC1 may be provided. FIG. 11 shows a schematic top view of another display panel according to embodiments of the present disclosure. In embodiments of the present disclosure, a solution of arranging the first voltage terminal 21 and the second voltage terminal 22 on a same side with a gate drive assembly 40 may be provided.

In connection with FIG. 10 and FIG. 11, in embodiments of the present disclosure, the display panel further includes a plurality of gate lines SL and a plurality of data lines DL. An extension direction of gate lines SL intersects with an extension direction of data lines DL. The display panel 100 further includes a source drive chip IC1 and a gate drive assembly 40. The source drive chip IC1 may be electrically connected to data lines DL and located in the extension direction of data lines DL. The gate drive assembly 40 may be electrically connected to gate lines DL and located in the extending direction of gate lines SL.

The first voltage terminal 21 and the second voltage terminal 22 may be arranged on the same side with the source drive chip IC1, or the first voltage terminal 21 and the second voltage terminal 22 may be arranged on the same side with the gate drive assembly 40.

In some embodiments, FIG. 10 and FIG. 11 show gate lines SL and data lines DL on the display panel. Gate lines SL may be electrically connected to the gate drive assembly 40. The gate drive assembly 40 may be configured to provide a gate drive signal to gate lines SL. In some embodiments, the gate drive assembly 40 is located in the extension direction of gate lines SL. FIG. 10 and FIG. 11 show a solution of arranging the gate drive assembly 40 at a left side frame of the display panel in some embodiments of the present disclosure. In some other embodiments, the gate drive assembly 40 may also be arranged on a right side frame of the display panel. In some other embodiments, gate drive assembly 40 may also be arranged on the left side frame and the right side frame. Data lines DL may be electrically connected to source drive chip IC1. The source drive chip IC1 may be configured to provide a source drive signal to data lines DL. In some embodiments, the source drive chip IC1 is located in the extension direction of data lines DL. FIG. 10 and FIG. 11 show a solution of arranging source drive chip IC1 at a lower frame of the display panel 100. In some embodiments of the present disclosure, source drive chip IC1 may also be arranged on an upper frame of the display panel 100, which is not limited by the present disclosure.

As shown in FIG. 10, the first voltage terminal 21 and the second voltage terminal 22 are arranged on the same side with source drive chip IC1. In some embodiments, the first voltage terminal 21, the second voltage terminal 22, and the source drive chip IC1 may be arranged at a position of the lower frame of the display panel, simultaneously. Since the flexible circuit board needs to be arranged at the position of the lower frame to provide a signal to the source drive chip IC1. Thus, the flexible circuit board required by the first voltage terminal 21 and the second voltage terminal 22 may be shared with the flexible circuit board that provides a signal to the source drier chip IC1. That is, the display signal and the heating drive signal may share the same flexible circuit board. Thus, the overall structure of the display panel may be simplified. In addition, when the first voltage terminal 21 and the second voltage terminal 22 are arranged on the same side with source drive chip IC1, the first heating bus 31 may only need to be extended to the first side A1 to be electrically connected to the first signal end 01 of the heating wire 10. The second heating bus 32 connected to the second voltage terminal 22 may be electrically connected to the second signal end 02 on the second side A2 without wiring on another side, which is also beneficial to simplify the wiring structure of the display panel.

As shown in FIG. 11, the first voltage terminal 21 and the second voltage terminal 22 are arranged on the same side with the gate drive assembly 40. In some embodiments, the first voltage terminal 21, the second voltage terminal 22, and the gate drive assembly 40 are arranged at the position of the left side frame of the display panel. Then, the first voltage terminal 21 and the second voltage terminal 22 may be electrically connected to the same flexible circuit board. In addition, since the position where the gate drive assembly 40 is located is neighboring to the first side A1 and the second side A2, when the first voltage terminal 21 and the second voltage terminal 22 are arranged on the same side with the gate drive assembly 40, the first voltage terminal 21 may be arranged at a position of the gate drive assembly 40 close to the first side A1, and the second voltage terminal 22 may be arranged at a position of the gate drive assembly 40 close to the second side A2. Thus, the first heating bus 31 that is led out from the first voltage terminal 21 may be extended from a position close to the first side A1 to the first side A1, and the second heating bus 32 that is led out from the second voltage terminal 22 may be extended from a position close to the second side A2 to the second side A2. As such, it is beneficial to reduce the lengths of the first heating bus 31 and the second heating bus 32. Thus, the power consumption on the first heating bus 31 and the second heating bus 32 may be reduced, and the heating wire 10 may obtain more effective power, which is more beneficial to improve the heating efficiency of the heating wire 10 to the display area AA.

Figure 12:
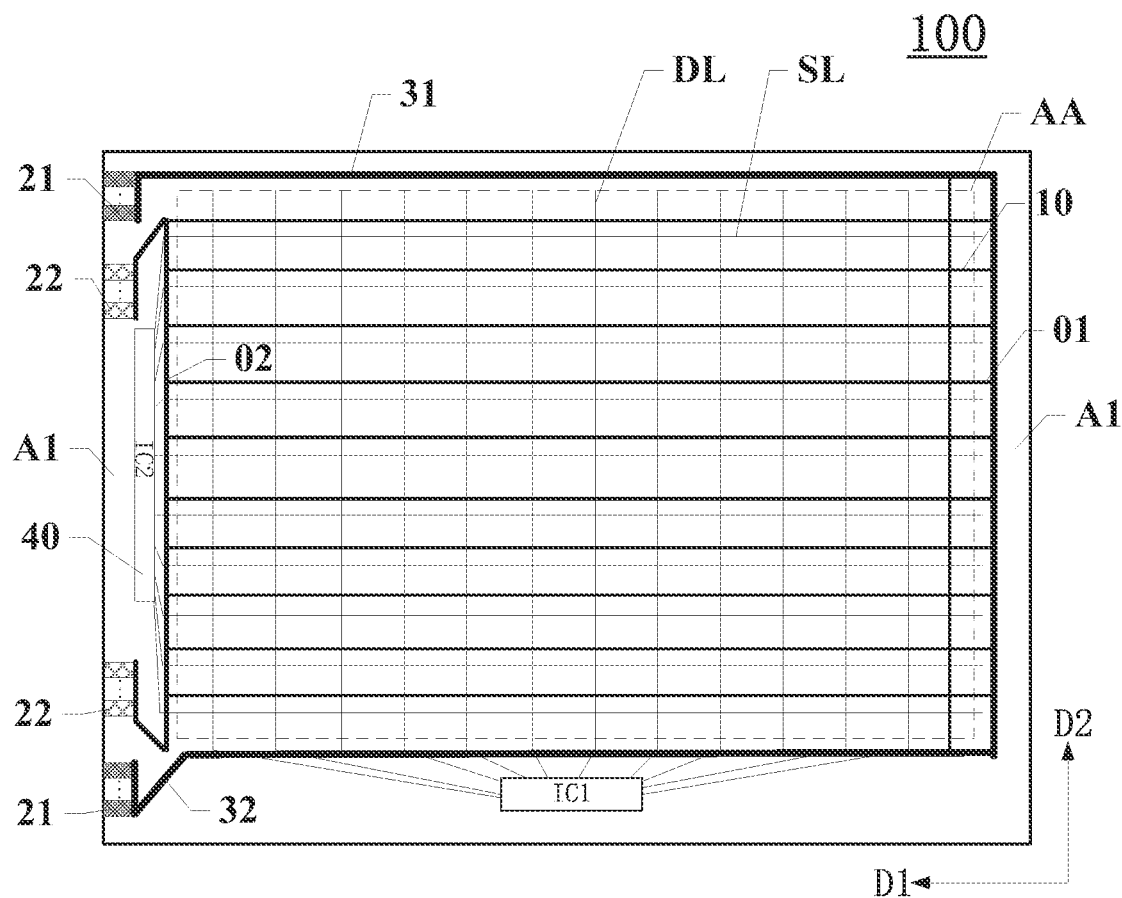
FIG. 12 is a schematic top view of another display panel according to some embodiments of the present disclosure.

In some embodiments, FIG. 10 and FIG. 11 show a solution that the extension direction of the heating wire 10 is the same as the extension direction of data line DL. In some other embodiments of the present disclosure, the extension direction of the heating wire 10 may also be the same as the extension direction of gate line SL. For example, FIG. 12 shows a schematic top view of another display panel according to embodiments of the present disclosure. When the first voltage terminal 21 and the second voltage terminal 22 are arranged on the same side with the gate drive assembly 40, the first heating bus 31 that is led out from the first voltage terminal 21 may be extended from positions of the upper and lower frames of the display panel 100 to the position where the first signal end 01 of the heating trace 10 is located, and the second heating bus 32 that is led out from the second voltage terminal 22 may be electrically connected to the second signal end 02 of the heating wire 10 on the side where the gate drive assembly 40 is located.

Refer to FIG. 10, in embodiments of the present disclosure, the display panel 100 includes two first voltage terminals 21 and two second voltage terminals 22. Along the second direction D2, the source drive chip IC1 or the gate drive assembly 40 is located between the two second voltage terminals 22. The two first voltage terminals 21 are located on two sides of the second voltage terminal 22 away from the source drive chip IC1 or the gate drive assembly 40, respectively.

In some embodiments, FIG. 10 shows a solution of introducing the two first voltage terminals 21 and the two second voltage terminals 22 when the first voltage terminals 21 and the second voltage terminals 22 are arranged on the same side with the source drive chip IC1. Then, the two second voltage terminals 22 are arranged between the two first voltage terminals 21. The source drive chip IC1 is arranged between the two second voltage terminals 22. Since data line DL in the display area AA may be electrically connected to the source drive chip IC1 through a fan-out wiring, when the source drive chip IC1 is arranged at a middle position of the side where the source drive chip IC1 is located, it is beneficial to realize an electrical connection between the source drive chip IC1 and different data lines DL. When the first voltage terminals 21 are arranged at the two ends of the side where the source drive chip IC1 is located, the first heating bus 31 may be facilitated to be extended from the side of the display panel to the first side A1 to be electrically connected to the first signal end 01. When the second voltage terminals 22 are arranged between the two first voltage terminals 21, the wiring of the second heating bus 32 may be facilitated. Thus, the complexity of the overall wiring of the display panel may be facilitated.

FIG. 10 shows an arrangement solution when the first voltage terminals 21 and the second voltage terminals 22 are arranged on the same side with the source drive chip IC1. For an arrangement solution when the first voltage terminals 21 and the second voltage terminals 22 are arranged on the same side with the gate drive assembly 40, reference may be made to the arrangement solution shown in FIG. 12, which is not repeated here.

The gate drive assembly 40 of embodiments of the present disclosure may include a gate drive chip IC2. For example, as shown in FIG. 10 to FIG. 12, a same gate drive chip IC2 is electrically connected to a plurality of gate lines SL. The plurality of gate lines SL may be driven by the gate drive chip IC2. FIG. 10 to FIG. 12 only show a solution of including one gate drive chip IC2 at a side frame of the display panel in embodiments of the present disclosure. In some other embodiments of the present disclosure, two or more gate drive chips IC2 may be ranged at the side frame of the display panel. Different gate drive chips IC2 may be connected to and drive different gate lines SL, respectively.

In addition to a chip drive method, in embodiments of the present disclosure, the gate lines SL may also be driven in a circuit drive manner. In some embodiments, the gate drive assembly 40 may include a plurality of cascaded shift registers. Each shift register may be connected to a gate line SL. Different scan lines may be driven by the shift registers to achieve the drive effect.

Figure 13:
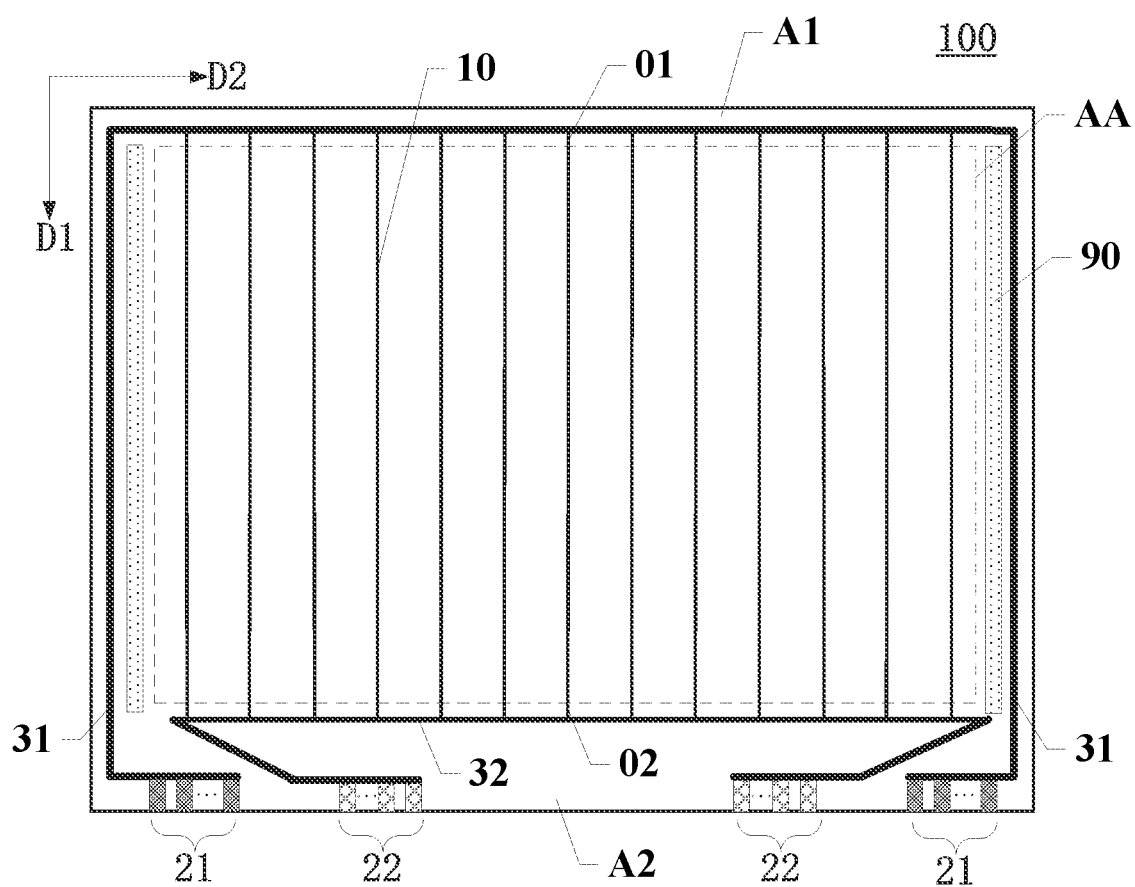
FIG. 13 is a schematic top view of another display panel according to some embodiments of the present disclosure.

FIG. 13 shows a schematic top view of another display panel according to some embodiments of the present disclosure. In embodiments of the present disclosure, the display panel includes a plurality of gate lines SL and a gate drive unit 90 connected to the gate lines SL. A part of the first heating bus 31 and the gate drive unit 90 are arranged on a same side of the display panel 100. A part of the first heating bus 31 is located on a side of the gate drive unit 90 away from the display area AA. Along the third direction, the first heating bus 31 does not overlap the gate drive unit 90. The display panel 100 includes a substrate 00. The third direction is perpendicular to a plane where the substrate 00 is located.

In some embodiments, when the first voltage terminal 21 and the first signal end 01 are arranged on different sides, the first heating bus 31 may be extended from the second side A2 to the first side A1. Thus, a part of the first heating bus 31 and the gate driving unit 90 may be arranged at a same side frame of the display panel 100 is disposed on the same side frame of the display panel 100. When the first heating bus 31 and the gate drive unit 90 are arranged on the same side frame of the display panel 100, if the first heating bus 31 and the gate drive unit 90 overlap in the direction perpendicular to the substrate 00, a capacitor may be formed between the first heating bus 31 and the gate drive unit A. Since the first heating bus 31 is usually wider, relatively many charges may be accumulated, which may cause a static electrIC1ty problem to affect a normal operation of display and heating. Therefore, when a part of a line segment of the first heating bus 31 and the gate drive unit 90 are arranged at the same side frame of the display panel 100, the first heating bus 31 may be arranged on the outer sides of the gate drive unit 90, that is, on sides of the gate drive unit 90 away from the display area AA, and the first heating bus 31 and the gate drive unit 90 may be prevented from overlapping in the direction perpendicular to the substrate 00. Thus, the capacitor formed between the first heating bus 31 and the gate drive unit 90 may be avoided, and the charges may not be accumulated, which is beneficial to ensure the normal heating and display operation of the display panel 100. In some embodiments, the gate drive unit 90 of embodiments of the present disclosure may include cascaded shift registers.

In some embodiments, in the display panel 100 of embodiments of the present disclosure, the first voltage terminal 21 may be a positive voltage terminal, and the second voltage terminal 22 may be a negative voltage terminal. In some other embodiments, the first voltage terminal 21 may be the negative voltage terminal, and the second voltage terminal 22 may be the positive voltage terminal.

In embodiments of the present disclosure, when the second voltage terminal 22 is the negative voltage terminal, the second voltage terminal 22 may be a ground end of the display panel 100.

In embodiments of the present disclosure, when the second voltage terminal 22 is used as the ground end of the display panel 100, a new voltage signal may not need to be provided to the second voltage terminal 22. The ground signal of the display panel may be reused, which is beneficial to reduce types of signal ends of the display panel 100 to simplify the control complexity of the display panel 100.

Figure 14:
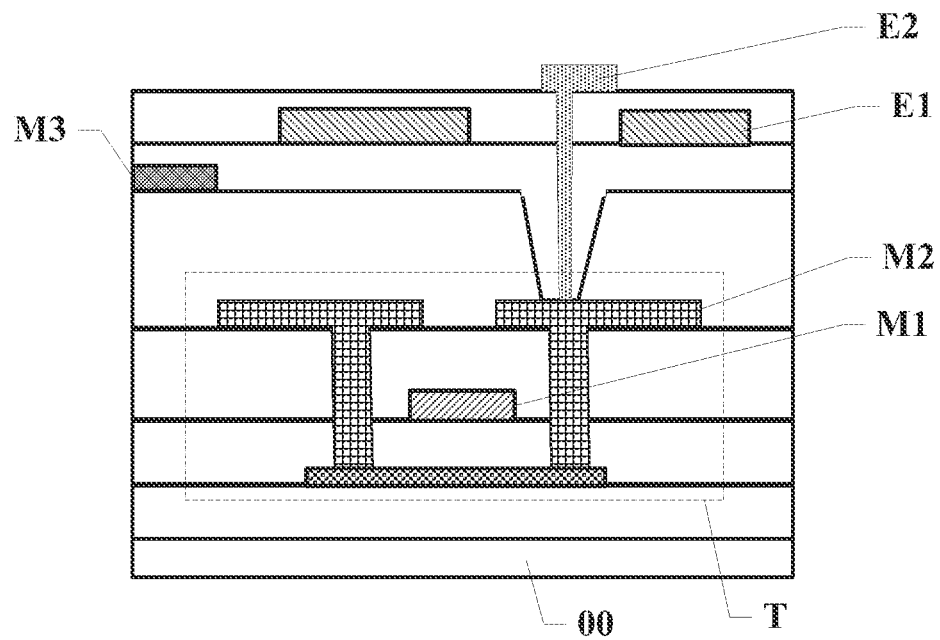
FIG. 14 is a schematic diagram showing a film layer of a display area in the display panel according to embodiments of the present disclosure.
Figure 15:
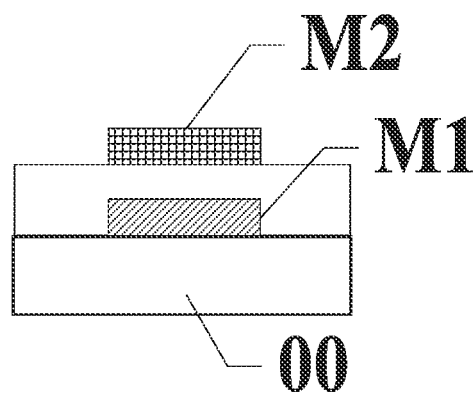
FIG. 15 is a schematic structural diagram showing a film layer of the heating bus in the display panel according to embodiments of the present disclosure.

FIG. 14 is a schematic diagram showing a film layer of a display area in the display panel according to embodiments of the present disclosure. FIG. 15 is a schematic structural diagram showing a film layer of the heating bus in the display panel according to embodiments of the present disclosure. In embodiments of the present disclosure, the display panel includes at least two metal layers on the substrate 00 and an insulation layer between the two neighboring metal layers along the direction perpendicular to the plane where the substrate 00 is located. The metal layers include a gate metal layer M1 and a source-drain metal layer M2. The gate metal layer M1 is located between the substrate 00 and the source-drain metal layer M2. In some embodiments, the first heating bus 31 and the second heating bus 32 of FIG. 1 to FIG. 13 may be arranged on the gate metal layer M1. In some other embodiments, the first heating bus 31 and the second heating bus 32 may be arranged on the source-drain metal layer M2. In some other embodiments, one of the first heating bus 31 and the second heating bus 32 may be arranged on the gate metal layer M1, and the other one may be located on the source-drain metal layer M2.

In some embodiments, in connection with FIG. 1 to FIG. 15, the display panel includes a plurality of metal layers and insulating layers. In order to realize the display function, the display panel may include a plurality of transistors T. For example, as shown in FIG. 14, a transistor of the plurality of transistors T includes a gate, an active layer, and a source-drain. The metal layer where the gate is located is the gate metal layer M1, and the metal layer where the source-drain is located is the source-drain metal layer M2. The gate metal layer M1 is located on the side of the source-drain metal layer M2 facing the substrate 00. In some embodiments, the display area of the display panel further includes a public electrode E1 and a pixel electrode E2. The pixel electrode E2 is electrically connected to the source or drain of the transistor T. In connection with FIG. 1, FIG. 14, and FIG. 15, the first heating bus 31 and the second heating bus 32 are arranged on the display panel. In some embodiments, the first heating bus 31 and the second heating bus 32 may be arranged on the gate metal layer M1. In some other embodiments, the first heating bus 31 and the second heating bus 32 may be arranged on the source-drain metal layer M2. In some other embodiments, one of the first heating bus 31 and the second heating bus 32 may be arranged on the gate metal layer M1, and the other one may be located on the source-drain metal layer M2. Thus, a new film layer structure may not need to be formed on the display panel for the first heating bus 31 and the second heating bus 32. The existing gate metal layer M1 or the source-drain metal layer M2 may be reused. The first heating bus 31 or the second heating bus 32 may be formed simultaneously when the gate metal layer M1 or the source-drain metal layer M2 is formed, which is beneficial to simplify the manufacturing process and reduce the production cost.

Figure 16:
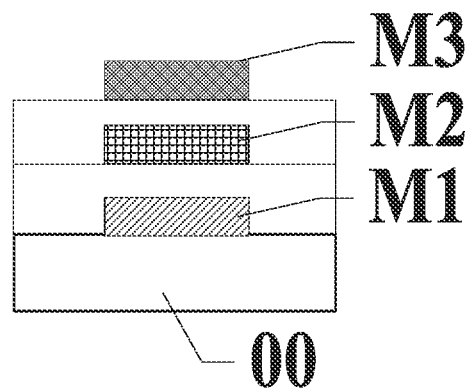
FIG. 16 is a schematic structural diagram showing another film layer of the heating bus in the display panel according to embodiments of the present disclosure.

FIG. 16 shows a schematic structural diagram of another film layer of the heating bus in the display panel according to some embodiments of the present disclosure. In some embodiments of the present disclosure, as shown in FIG. 1 to FIG. 13 and FIG, the display panel includes a gate metal layer M1, a source-drain metal layer M2, and an auxiliary metal layer M3 formed on the substrate 00. The gate metal layer M1 is formed between the substrate 00 and the source-drain metal layer M2. The auxiliary metal layer M3 is formed on a side of the gate metal layer M1 facing the substrate 00, or on a side of the source-drain metal layer M2 away from the substrate 00. In some embodiments, the first heating bus 31 and the second heating bus 32 may be both formed on the auxiliary metal layer M3. In some other embodiments, one of the first heating bus 31 and the second heating bus 32 may be formed on the auxiliary metal layer M3, and the other one may be formed on the gate metal layer M1 or the source-drain metal layer M2.

In some embodiments, as shown in FIG. 16, the display panel includes an auxiliary metal layer M3 in addition to the gate metal layer M1 and the source-drain metal layer M2. FIG. 16 only shows a solution that the auxiliary metal layer M3 is formed on a side of the source-drain metal layer M2 away from the substrate 00. In some other embodiments of the present disclosure, the auxiliary metal layer M3 may also be formed on a side of the gate metal layer M1 facing the substrate 00.

When the available space of the gate metal layer M1 or the source-drain metal layer M2 of the display panel is limited, both the first heating bus 31 and the second heating bus 32 may be arranged on the auxiliary metal layer M3, or one of the first heating bus 31 and the second heating bus 32 may be arranged on the auxiliary metal layer M3, and the other one may be arranged on the gate metal layer M1 or the source-drain metal layer M2 to improve the problem of insuffiClent space. The first heating bus 31 or the second heating bus 32 arranged on the auxiliary metal layer M3 may be better insulated from other metal wirings of the display panel to avoid mutual interference between signals and improve system stability.

In some embodiments, the auxiliary metal layer M3 of the display panel may include a film layer on which a touch control wiring or a bridge structure is arranged. Thus, fewer metal wirings may be arranged on the auxiliary metal layer M3, and enough space may be available for arranging the heating bus. When the first heating bus line 31 or the second heating bus line 32 is arranged on the auxiliary metal layer M3, another film layer structure may not need to be formed for the first heating bus 31 or the second heating bus 32. The existing film layer structure may be reused. Therefore, the film layer structure of the display panel and the production process of the display panel may be simplified.

Figure 17:
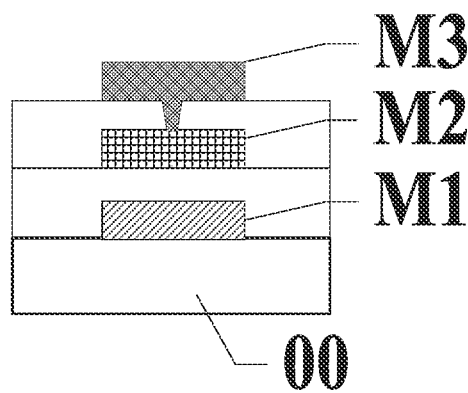
FIG. 17 is a schematic structural diagram showing another film layer of the heating bus in the display panel according to embodiments of the present disclosure.

Above embodiments show the solution of arranging the first heating bus 31 on a metal layer or arranging the second heating bus 32 on a metal layer. In some other embodiments of the present disclosure, the first heating bus 31 or the second heating bus 32 may be arranged on two or more metal layers. For example, FIG. 17 is another schematic structural diagram showing a film layer of the heating bus in the display panel according to embodiments of the present disclosure. In connection with FIG. 1 to FIG. 13 and FIG. 17, in some embodiments of the present disclosure, the display panel includes a substrate 00, and a gate metal layer M1, a source-drain metal layer M2, and an auxiliary metal layer M3 formed on the substrate 00. The gate metal layer M1 is formed between the substrate 00 and the source-drain metal layer M2. The auxiliary metal layer M3 may be formed on a side of the gate metal layer M1 facing the substrate 00, or on a side of the source-drain metal layer M2 away from the substrate 00. The first heating bus 31 is arranged on at least two layers of the gate metal layer M1, the source-drain metal layer M2, or the auxiliary metal layer M3, and the parts of different metal layers on which the first heating bus 31 is arranged may be electrically connected to each other, and/or the second heating bus 32 may be located on at least two layers of the gate metal layer M1, the source-drain metal layer M2, and the auxiliary metal layer M3, and the parts of different metal layers on which the second heating bus 32 is located may be electrically connected to each other.

Figure 18:
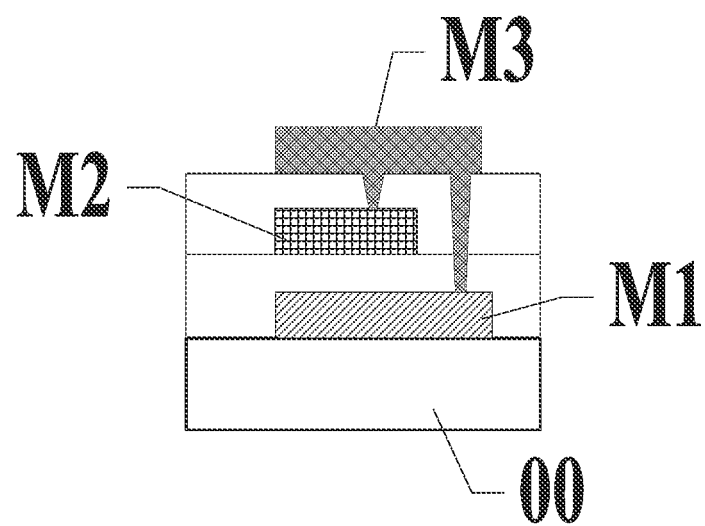
FIG. 18 is a schematic structural diagram showing another film layer of the heating bus in the display panel according to embodiments of the present disclosure.

In some embodiments, the heating wire shown in FIG. 17 includes, for example, the first heating bus 31 or the second heating bus 32. By taking the first heating bus 31 as an example, FIG. 17 shows a solution of arranging the first heating bus 31 on the auxiliary metal layer M3 and the source-drain metal layer M2. The parts of the first heating bus 31 arranged on the auxiliary metal layer M3 and the source-drain metal layer M2 may be electrically connected to each other through a connection hole. In some other embodiments of the present disclosure, the first heating bus 31 may also be arranged on the source-drain metal layer M2 and the gate metal layer M1. The parts of the first heating bus 31 arranged on the source-drain metal layer M2 and the gate metal layer M1 may be electrically connected to each other through a connection hole. In some other embodiments of the present disclosure, the first heating bus 31 may also be arranged on the three layers of the gate metal layer M1, the source-drain metal layer M2, and the auxiliary metal layer M3. For example, as shown in FIG. 18, the parts of the first heating bus 31 arranged on the gate metal layer M1, the source-drain metal layer M2, and the auxiliary metal layer M3 may be electrically connected to each other. For example, in a bridge connection manner shown in FIG. 18, the part of the first heating bus 31 arranged on the auxiliary metal layer M3 is electrically connected to the parts of the first heating bus 31 arranged on the source-drain metal layer M2 and the gate metal layer M1 through the connection holes. In addition to this connection manner, the auxiliary metal layer M3 and the source-drain metal layer M2 may be electrically connected through the connection hole. Then, the source-drain metal layer M2 may be electrically connected to the gate metal layer M1, which is not limited in the present disclosure. FIG. 18 shows a schematic diagram showing another film layer structure of the heating bus in the display panel according to embodiments of the present disclosure.

When the heating bus is distributed in two or three metal layers in embodiments of the present disclosure, the parts arranged on different metal layers may be regarded as a parallel structure, which is beneficial to reduce the overall impedance of the heating bus and reduce the power consumption on the heating bus. Therefore, the heating bus may obtain more effective power, which is beneficial to improving the heating efficiency of the display panel.

The first heating bus 31 is taken as an example for the description above. When the second heating bus 32 is arranged on two or three metal layers, for the arrangement structure of the second heating bus 32, reference may be made to the arrangement structure of the first heating bus 31 above, which is not repeated here.

Figure 19:
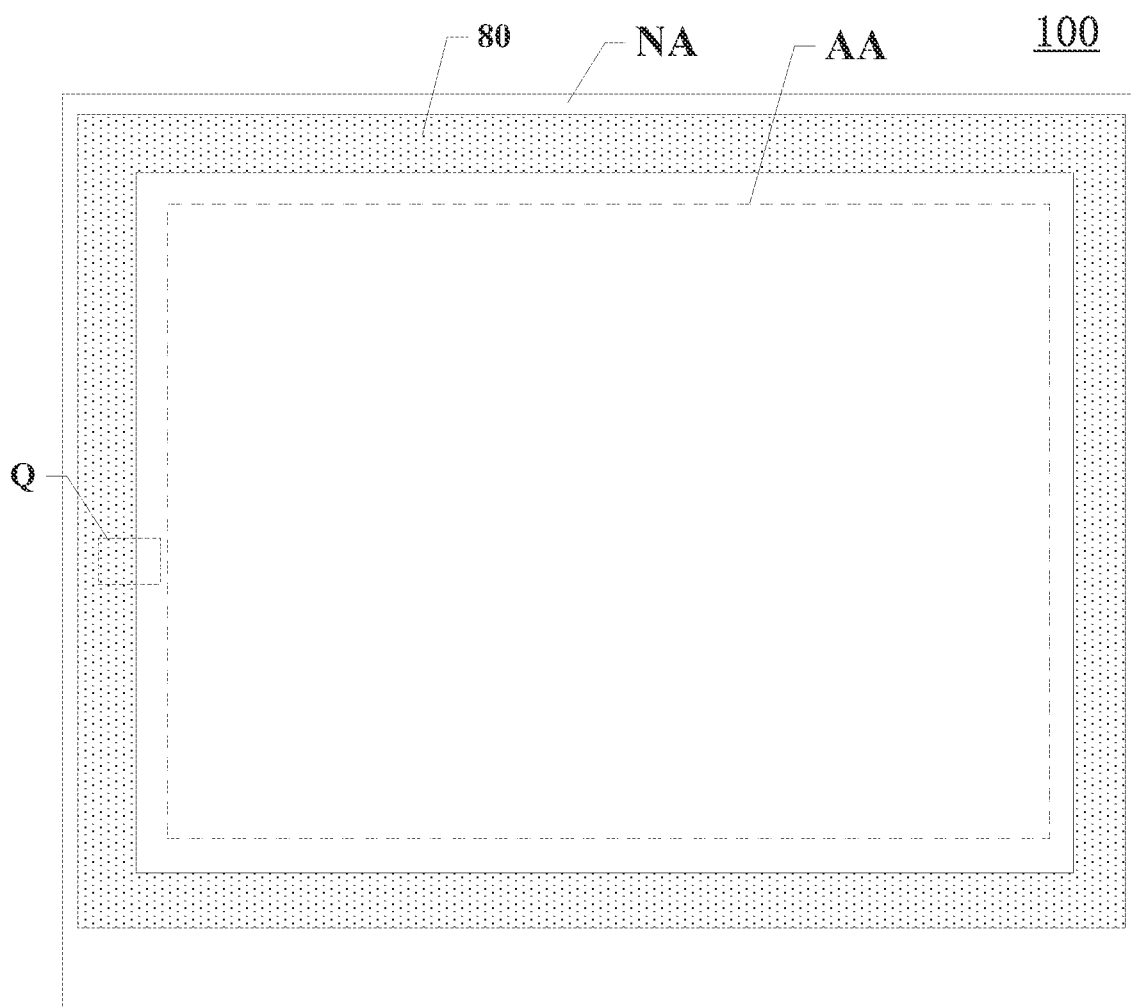
FIG. 19 is a schematic top view of another display panel according to some embodiments of the present disclosure.
Figure 20:
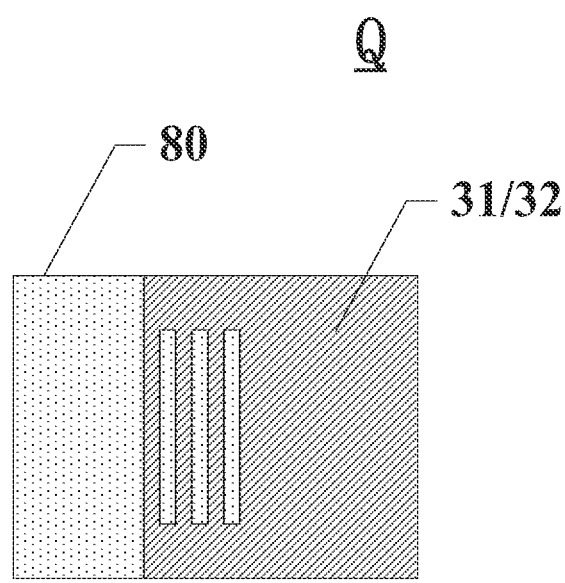
FIG. 20 is a schematic enlarged diagram showing an area Q in FIG. 19.

FIG. 19 is a schematic top view of another display panel according to some embodiments of the present disclosure. When the display panel is a liquid crystal display panel, as shown in FIG. 2 and FIG. 19, in the non-display area NA, the array substrate and the color film substrate are sealed by a sealant 80. The liquid crystal is filled in a sealed space formed by the array substrate 101, the color film substrate 102, and the sealant 80. As shown in FIG. 1, the sealant 80 is located in the non-display area NA, and the first heating bus 31 and the second heating bus 32 of embodiments of the present disclosure are also arranged in the non-display area NA. Therefore, in the non-display area NA, the first heating bus 31 and the second heating bus 32 may overlap. FIG. 20 shows an enlarged schematic diagram of the area Q in FIG. 19. FIG. 20 shows a relative position relationship diagram between the sealant and the heating bus in the display panel according to some embodiments of the present disclosure. FIG. 20 is a schematic diagram showing the overlap between the sealant and the heating bus at a partial position of the non-display area NA. In some embodiments, when the first heating bus 31 or the second heating bus 32 is arranged on the array substrate, the first heating bus 31 or the second electric heating bus 32 may be arranged between the substrate of the array substrate and the sealant 80. In the structure of FIG. 20, the first heating bus 31 or the second heating bus 32 is on the top, and the sealant 80 is on the bottom, which is equivalent to a view seeing from a side of the substrate of the array substrate.

In connection with FIG. 1 to FIG. 13, FIG. 19, and FIG. 20, in embodiments of the present disclosure, the sealant 80 is in the non-display area NA. Along the direction perpendicular to the plane where the substrate 00 is located, the first heating bus 31 or the second heating bus 32 overlaps with the sealant 80 to form an overlapping area. In the overlapping area, the first heating bus 31 or the second heating bus 32 may be in a hollow shape or comb shape.

In some embodiments, the display panel of embodiments of the present disclosure may include a liquid crystal display panel. In order to prevent liquid crystal leakage and entry of an external contaminant, the frame sealant 80 may be coated on a peripheral area of the display panel. Currently, the sealant 80 used in the display field is usually cured in an ultraviolet light and heat curing manner. When the first heating bus 31 or the second heating bus 32 is arranged in the frame area of the display panel, since the heating bus is made of metal, the heating bus may block the ultraviolet light to a certain degree. Thus, in embodiments of the present disclosure, the overlapping area between the first heating bus 31 or the second bus 32 and the sealant 80 may be in a hollow shape or a comb shape to ensure that the first heating bus 31 or the second heating bus 32 has a certain light transmittance. Therefore, the sealant 80 that overlaps with the first heating bus 31 or the second heating bus 32 may be cured reliably, which is beneficial to improve the seal reliability after arranging the first heating bus 31 and the second heating bus into the display panel.

Figure 21:
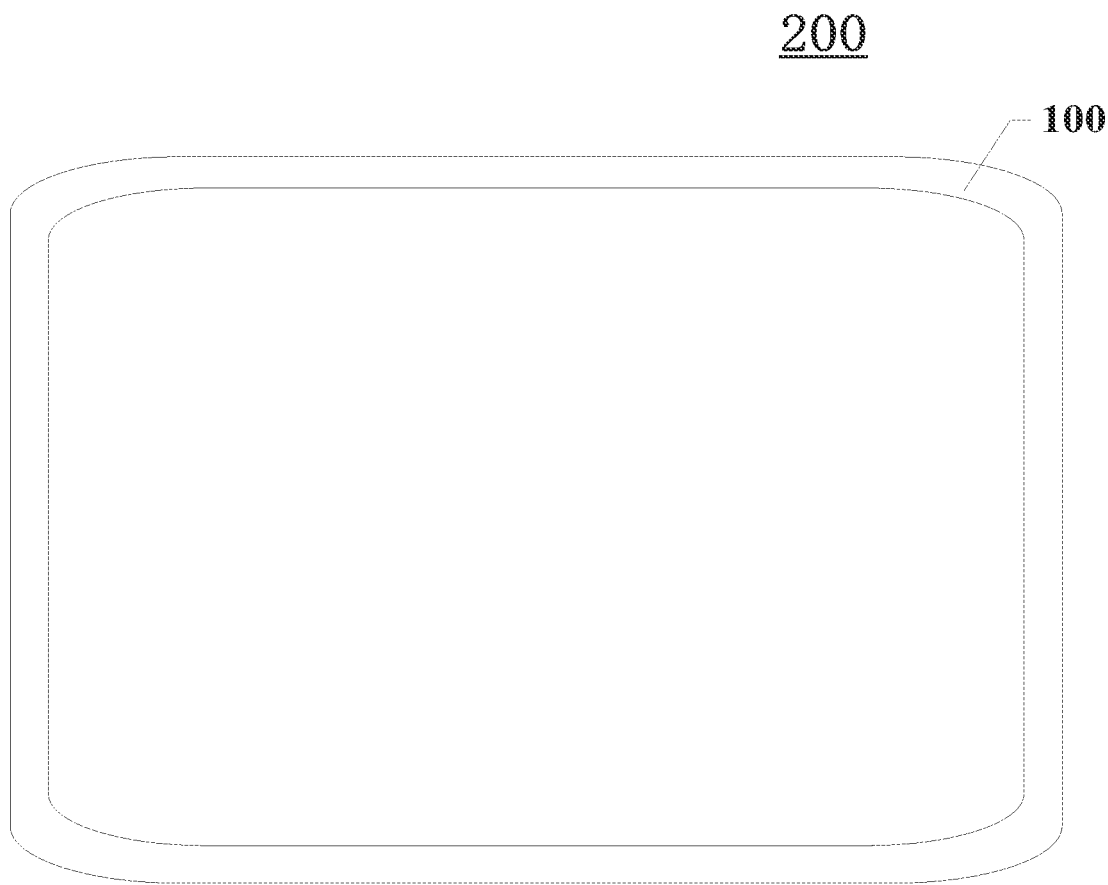
FIG. 21 is a schematic structural diagram of a display device according to some embodiments of the present disclosure.

Based on the same concept, the present disclosure also provides a display device. FIG. 21 is a schematic structural diagram of the display device according to some embodiments of the present disclosure. As shown in FIG. 21, the display device includes the display panel of any embodiments of the present disclosure. Since the heating wire 10 is arranged in the display panel of embodiments of the present disclosure, the structure of the display device may be significantly simplified compared with the solution of introducing the heater individually. The first signal end of the first heating bus 31 may be arranged on the first side A1 of the display panel. The second signal end of the first heating bus 31 may be arranged on the second side A2. Thus, the wiring complexity of the display device may be simplified, the manufacturing process may be simplified, and the manufacturing cost may be saved.

For embodiments of the display device of the present disclosure, reference may be made to embodiments of the display panel, which are not repeated here. The display device of embodiments of the present disclosure may include any product or component having a display function, such as a cell phone, a tablet computer, a television, a monitor, a laptop, a digital photo frame, and a navigator. The display device may be suitable for a display apparatus that may be used in a low temperature environment.

In summary, the display panel and the display device of the present disclosure may at least achieve the following beneficial effects.

In the display panel and the display device of the present disclosure, the heating wire is arranged in the display panel. In the low temperature display phase, the heating wire may be configured to heat the display panel, which satisfies the normal use requirement of the display product in a low temperature environment. The structure of the product may be significantly simplified compared to the solution of additionally introducing the heater in the existing technology. In the present disclosure, the first signal ends of the heating wires may be arranged on the first side of the display area along the first direction, and the second signal ends of the heating wires may be arranged on the second side of the display area along the first direction. Thus, the first signal ends of the heating wires may receive the heating drive signal through the same heating bus. The second signal ends of the heating wires may receive the heating drive signal through the other heating bus. Therefore, the wiring complexity may be reduced after the heating wires are arranged in the display panel, the manufacturing process may be simplified, and the cost may be saved.

Although some embodiments of the present disclosure have been described in detail through examples, those skilled in the art should understand that the above examples are only provided for illustration and are not provided to limit the scope of the present disclosure. Those skilled in the art should understand that without departing from the scope and spirit of the present disclosure, modifications may be made to embodiments of the present disclosure. The scope of the present application should be defined by the appended claims.

What is claimed is:

1. A display panel comprising:
a substrate including a display area;
a non-display area at least partially surrounds the display area; and
a plurality of heating wires located at least in the display area, the plurality of the heating wires extending along a first direction and being arranged along a second direction, and the first direction intersecting with the second direction;
wherein:
each heating wire of the plurality of heating wires includes a first signal end and a second signal end;
the first signal end and the second signal end of a same heating wire are located on two sides of the same heating wire along the first direction;
first signal ends of the plurality of heating wires are located on a first side of the display area along the first direction, and are electrically connected to a first voltage terminal through a first heating bus, wherein the first heating bus is merely located in the non-display area, and is extended along the non-display area from a second side to the first side of the display area to electrically connect the first signal ends with the first voltage terminal;
second signal ends of the plurality of heating wires are located on the second side of the display area along the first direction;
the first side and the second side are opposite to each other; and
the display panel further includes a plurality of gate lines and a gate drive unit connected to the plurality of gate lines, a part of the first heating bus and the gate drive unit being arranged on a same side of the display panel, and the part of the first heating bus being arranged on a side of the gate drive unit away from the display area, along a third direction, the first heating bus and the gate drive unit not overlapping, and the third direction being perpendicular to a plane where the substrate is located.

2. The display panel according to claim 1, further comprising:
a second voltage terminal, the second signal ends being electrically connected to the second voltage terminal through a second heating bus located in the non-display area.

3. The display panel according to claim 2, wherein the first voltage terminal and the second voltage terminal are arranged on a same side of the display area.

4. The display panel according to claim 3, wherein the first voltage terminal and the second voltage terminal are both located on the second side of the display area.

5. The display panel according to claim 4, further comprising:

two first voltage terminals, the first heating bus being led out from one of the first voltage terminals and extending along the non-display area to the first side and from the first side to the other one of the first voltage terminals, and the two first voltage terminals being electrically connected to the first heating bus.

6. The display panel according to claim 4, further comprising:
two second voltage terminals, the second heating bus being led out from one of the second voltage terminals and extending from the second side to the other one of the second voltage terminals, and the two second voltage terminals being electrically connected to the second heating bus.

7. The display panel according to claim 4, further comprising:
two first voltage terminals and two second voltage terminals, along the second direction, the two second voltage terminals being arranged between the two first voltage terminals.

8. The display panel according to claim 2, wherein:
the first voltage terminal includes a plurality of first heating welding plates, the same first heating bus being electrically connected to the plurality of first heating welding plates; and
the second voltage terminal includes a plurality of second heating welding plates, the same second heating bus being electrically connected to the plurality of second heating welding plates.

9. The display panel according to claim 2, further comprising:
a plurality of data lines, an extension direction of the plurality of gate lines and an extension direction of the plurality of data lines intersecting with each other;
a source drive chip electrically connected to the plurality of data lines and in the extension direction of the plurality of data lines; and
the gate drive unit electrically connected to the plurality of gate lines and arranged in the extension direction of the plurality of gate lines;
wherein:
the first voltage terminal and the second voltage terminal are arranged on a same side with the source drive chip.

10. The display panel according to claim 9, further comprising:
two first voltage terminals and two second voltage terminals, and along the second direction, the source drive chip being arranged between the two second voltage terminals, and the two first voltage terminals being arranged on two sides of the second voltage terminals away from the source drive chip.

11. The display panel according to claim 2, wherein the second voltage terminal is a ground end of the display panel.

12. The display panel according to claim 2, further comprising:
at least two metal layers formed on the substrate and including:
a source-drain metal layer; and
a gate metal layer formed between the substrate and the source-drain metal layer; and
an insulation layer formed between two neighboring metal layers along a direction perpendicular to a plane where the substrate is located;
wherein:
the first heating bus and the second heating bus are arranged on the gate metal layer; or
the first heating bus and the second heating bus are arranged on the source-drain metal layer; or
one of the first heating bus and the second heating bus is arranged on the gate metal layer, and the other one of the first heating bus and the second heating bus is arranged on the source-drain metal layer.

13. The display panel according to claim 2, further comprising:
a source-drain metal layer;
a gate metal layer formed between the substrate and the source-drain layer; and
an auxiliary metal layer formed on a side of the gate metal layer facing the substrate or on a side of the source-drain metal layer away from the substrate;
wherein:
the first heating bus and the second heating bus are arranged on the auxiliary metal layer; or
one of the first heating bus and the second heating bus is arranged on the auxiliary metal layer, and the other one of the first heating bus and the second heating bus is arranged on the gate metal layer or the source-drain metal layer.

14. The display panel according to claim 2, further comprising:
a source-drain metal layer;
a gate metal layer formed between the substrate and the source-drain layer; and
an auxiliary metal layer formed on a side of the gate metal layer facing the substrate or on a side of the source-drain layer away from the substrate;
wherein:
the first heating bus is arranged on at least two of the gate metal layer, the source-drain metal layer, or the auxiliary metal layer, parts of the first heating bus arranged on different metal layers being electrically connected to each other; and/or
the second heating bus is arranged on at least two of the gate metal layer, the source-drain metal layer, or the auxiliary metal layer, parts of the second heating bus arranged on different metal layers being electrically connected to each other.

15. The display panel according to claim 2, wherein:
the non-display area includes a sealant;
along a direction perpendicular to a plane where the substrate is located, the first heating bus or the second heating bus overlaps with the sealant to form an overlap area; and
in the overlap area, the first heating bus or the second heating bus is in a hollow shape or a comb shape.

16. A display device comprising a display panel, including:
a substrate including a display area;
a non-display area at least partially surrounds the display area; and
a plurality of heating wires located at least in the display area, the plurality of the heating wires extending along a first direction and being arranged along a second direction, and the first direction intersecting with the second direction;
wherein:
each heating wire of the plurality of heating wires includes a first signal end and a second signal end;
the first signal end and the second signal end of a same heating wire are located on two sides of the same heating wire along the first direction;
first signal ends of the plurality of heating wires are located on a first side of the display area along the first direction, and are electrically connected to a first voltage terminal through a first heating bus, wherein the first heating bus is merely located in the non-display area, and is extended along the non-display area from a second side to the first side of the display area to electrically connect the first signal ends with the first voltage terminal;

second signal ends of the plurality of heating wires are located on the second side of the display area along the first direction; and the first side and the second side are opposite to each other; and the display panel further includes a plurality of gate lines and a gate drive unit connected to the plurality of gate lines, a part of the first heating bus and the gate drive unit being arranged on a same side of the display panel, and the part of the first heating bus being arranged on a side of the gate drive unit away from the display area, along a third direction, the first heating bus and the gate drive unit not overlapping, and the third direction being perpendicular to a plane where the substrate is located.

17. The display device according to claim 16, further comprising:

a second voltage terminal, the second signal ends being electrically connected to the second voltage terminal through a second heating bus located in the non-display area.

18. The display panel according to claim 17, wherein the first voltage terminal and the second voltage terminal are arranged on a same side of the display area.

\* \* \* \* \*